US012636637B2

(12) United States Patent
Zeller et al.

(10) Patent No.: US 12,636,637 B2
(45) Date of Patent: May 26, 2026

(54) MONOLITHIC MICROPOROUS SUBSTRATE FOR CHROMATOGRAPHIC BEDS

(71) Applicant: SPF Technologies LLC, Belmont, MA (US)

(72) Inventors: Robert S Zeller, Boston, MA (US); Gaston de los Rey, Somerville, MA (US); Erik O. Blomquist, Jamaica Plain, MA (US)

(73) Assignee: SPF TECHNOLOGIES LLC, Somerville, MA (US)

( * ) Notice: Subject to any disclaimer, the term of this patent is extended or adjusted under 35 U.S.C. 154(b) by 196 days.

(21) Appl. No.: 18/646,164

(22) Filed: Apr. 25, 2024

(65) Prior Publication Data

US 2024/0367150 A1      Nov. 7, 2024

Related U.S. Application Data

(60) Provisional application No. 63/463,271, filed on May 1, 2023.

(51) Int. Cl.
B01J 20/285 (2006.01)
B01D 15/10 (2006.01)
(Continued)

(52) U.S. Cl.
CPC ............ B01J 20/285 (2013.01); B01D 15/10 (2013.01); B01J 20/28004 (2013.01);
(Continued)

(58) Field of Classification Search
CPC ........ B01D 15/10; B01D 15/22; B01D 39/16; B01D 39/1661; B01D 39/1623; B01D 69/02; B01D 69/10; B01D 69/1071;

B01D 46/247; B01J 20/285; B01J 20/28004; B01J 20/28023; B01J 20/28042; B01J 20/28085; B01J 20/3007; B01J 20/3035; B01J 20/3078; B01J 20/28; B01J 20/30; B07B 1/343; B32B 5/02; B32B 5/022; H01M 4/8807; G01N 30/60; G01N 30/6047; C08F 291/00; C07K 1/22
(Continued)

(56) References Cited

U.S. PATENT DOCUMENTS 3,330,411 A * 7/1967 Erlenstadt ............... B07B 1/343
209/415
10,850,259 B2 12/2020 Hardick et al.
(Continued)

FOREIGN PATENT DOCUMENTS

CN 105126734 A 12/2015
WO 2023015741 A1 2/2023

OTHER PUBLICATIONS

International Search Report PCT/US2024/026224, Jun. 20, 2024,Sep. 6, 2024.

*Primary Examiner* — Akash K Varma
(74) *Attorney, Agent, or Firm* — Barry Gaiman

(57) ABSTRACT

Methods and devices are disclosed for a separation device including a sintered polymeric monolith having polymeric microparticulate solids with a pore size from about 0.5 to about 8 microns, a porosity between about 50 percent to about 80 percent and a chromatographic uniformity characterized by an HETP (height equivalent of a theoretical plate) less than about 100 microns.

14 Claims, 19 Drawing Sheets

(51) Int. Cl.
  *B01J 20/28*    (2006.01)
  *B01J 20/30*    (2006.01)

(52) U.S. Cl.
  CPC ... *B01J 20/28023* (2013.01); *B01J 20/28042*
    (2013.01); *B01J 20/28085* (2013.01); *B01J*
    *20/3007* (2013.01); *B01J 20/3035* (2013.01);
          *B01J 20/3078* (2013.01)

(58) Field of Classification Search
  USPC ............................................... 210/198.2, 507
  See application file for complete search history.

(56)        References Cited

U.S. PATENT DOCUMENTS

| | | | |
|---|---|---|---|
| 2006/0078784 A1* | 4/2006 | Liu ..................... | H01M 4/8807 |
| | | | 429/480 |
| 2010/0155323 A1* | 6/2010 | Weiss ................... | C08F 291/00 |
| | | | 210/507 |
| 2016/0288089 A1* | 10/2016 | Hardick .................. | C07K 1/22 |
| 2016/0289249 A1 | 10/2016 | Kshirsagar et al. | |
| 2019/0202747 A1* | 7/2019 | Drury ................. | B01D 46/247 |

* cited by examiner

400

401n

401b

401a

402

450

404

403

404

400

402

850

870

MONOLITHIC MICROPOROUS SUBSTRATE FOR CHROMATOGRAPHIC BEDS

RELATED APPLICATIONS

This application claims the benefit of Provisional Application Ser. No. 63/463,271 entitled MONOLITHIC MICROPOROUS SUBSTRATE FOR CHROMATO-GRAPHIC BEDS filed May 1, 2023 which application is hereby incorporated herein by reference in its entirety.

FIELD OF THE INVENTION

The field of this invention is related to adsorptive devices and processes, of which chromatography is an example. More specifically, this invention relates to fabrication of monolithic microporous substrates produced by sintering microparticulate solids, thermoplastic or non-thermoplastic, referred to as monoliths.

BACKGROUND OF INVENTION

Adsorptive processes and devices are widely used in the analysis and purification of chemicals, including synthetic and naturally-derived pharmaceuticals, blood products and recombinant proteins. Chromatography is a general separation technique that relies on the relative affinity or distribution of the molecules of interest between a stationary phase and a mobile phase for molecular separation. The stationary phase typically includes a porous media imbibed with solvent. The mobile phase includes a solvent, which can be aqueous or organic, that flows through the interstitial space that exists between the spaces occupied by the stationary phase.

Columns with associated end caps, fittings and tubing are the most common configuration, with the media packed into the tube or column. The mobile phase is pumped through the column. The sample is introduced at one end of the column, the feed end, and the various components interact with the stationary phase by any one of a multitude of adsorptive phenomena. The differential adsorptive interaction between the components and media leads them to traverse the column at different velocities, which results in a physical separation of the components in the mobile phase. The separated components are collected or detected at the other end of the column, the eluent end, in the order in which they travel in the mobile phase. In one type of adsorptive process, referred to as capture and release process, the process involves multiple steps, first to load the media, then to wash it, and then to elute it.

Chromatographic methods include among other methods, gel chromatography, ion exchange chromatography, hydrophobic interaction chromatography, reverse phase chromatography, affinity chromatography, immuno-adsorption chromatography, lectin affinity chromatography, ion affinity chromatography and other such well-known chromatographic methods.

Adsorptive media comes in many forms, most typically in the form of beads. The beads are conventionally packed into columns, with the column walls and ends immobilizing the beads into a fixed adsorptive bed, a bed being a porous three-dimensional structure containing the stationary phase (in this case the beads) the space through which the mobile phase flows/permeates between the beads (the interstitial space) and the pore space within the beads, permeated by the mobile phase and accessible to the target solutes through diffusion. Membrane-based adsorptive devices have been developed. In these devices the adsorptive media is either supported by or embedded into a flat microporous membrane or a non-woven web, which is then fabricated into adsorptive devices (hereafter "web-based media" and "web-based devices"). Two or more of these membranes or webs may be stacked to form an adsorptive bed with a longer flow path; however, the number of layers that can be stacked is limited by the low hydraulic permeability of microfiltration membranes. Such filtration devices are characterized by the fact that the fluid being treated flows through the adsorptive media in a direction approximately perpendicular to the planar dimension of the media. The virtue of membrane or web-based adsorbers is their fast kinetics, enabling them to have short bed depths and high feed rates. Furthermore, adsorptive media may also be formed into cohesive beds that retain their shape by virtue of the cohesion in the media. This type of adsorptive media is referred to as monolithic media, or simply as monoliths.

Chromatography is conventionally practiced with a single column whose size/volume is determined by the processing capacity required. Columns of different diameter and height are sold and these are packed with the desired adsorptive media into a single chromatographic bed. Recently modular chromatography with pre-packed modules has emerged as a highly desirable format due to the many advantages provided by modularity. In modular chromatography modules having an adsorptive media volume of 100 mL to several liters are assembled into larger arrays of modules fluidically in-parallel or parallel/series configuration.

The same attributes that confer membrane or monolithic media with fast kinetics limit their capacity. Additionally, the intrinsic geometry of existing membrane adsorbers limit their scalability, the largest ones typically being no larger than five liters. Furthermore, the bed depth, or absorptive path length, important in purification steps requiring resolution, is limited in membrane-based devices due to the low hydraulic permeability of microporous membranes. Membrane absorptive media is expensive, because the high cost of the membrane substrate and the challenges of functionalizing the membrane surface with absorptive chemistry. Finally, membrane-based adsorptive devices inherently have low capacity, and as a result membrane adsorption devices have found applicability primarily in "polishing" steps (e.g., virus and DNA removal) where the adsorptive load is negligible, rather than in the primary purification steps.

Planar, stackable and modular adsorptive devices have also been developed for bead-based media under the tradename Chromassette® and for membrane-based media under the tradename ChromaWeb® (SPFtechnologies.com), respectively, as described in U.S. Pat. Nos. 8,506,802, 9,120,037, 9,599,594 and 11,395,980 (inventor de los Reyes). These modular chromatography devices (hereafter "modular devices") deliver significant benefits over conventional chromatographic columns: the modules or cassettes are delivered to the end-user pre-packed, are linearly scalable, have high chromatographic resolution (making them suitable for primary capture steps), can be assembled by the end-user by stacking the cassettes into larger adsorptive units of sizes to fit the process capacities required (referred to by those skilled in the art as "right sizing"), or purchased as pre-assembled ready-to-use "blocks" (i.e., assembly of multiple cassettes). Other examples of modular chromatography are Sartobind® cassettes, membrane-based devices stacked in parallel arrays (Sartorius Corporation). Modular chromatography can also be practiced with (small) conventional columns assembled into a parallel array to form a larger adsorptive unit as described by U.S. Pat. No. 10,830, 740.

The significant benefits of modular chromatography are leading many drug manufacturers to evaluate them for adoption into their processes. Sartobind® cassettes are already widely adopted in polishing applications, wherein low-level contaminants are removed from a solution of highly purified therapeutic agent. However, these cassettes do not have good resolution and would not be useful for chromatographic separations requiring high resolution, such as that required for primary capture using affinity chromatography, or that required to purify streams that use elution chromatography.

For modular chromatography to become widely adopted in high-resolution chromatographic processes a module array needs to meet certain requirements:

1. Each module comprising the array must have high chromatographic resolution (hereafter, high resolution).
2. Each module comprising the array must be approximately similar to each other, having approximately similar retention volume and approximately similar hydraulic resistance.

For example, similar modules having excellent chromatographic resolution but different hydraulic resistance would result in a parallel array that does not have good chromatographic resolution. Therefore, not only does each module need to have good chromatographic resolution and similar hydraulic resistance to every other module in the parallel array, but the flow into the array needs to be evenly distributed among the modules, otherwise the chromatographic resolution of the array will be impaired.

The purification and concentrating of genetic materials are critical to the development and production of gene therapies. However, conventional methods developed to purify proteins and other organic molecules are not always as effective when dealing with genetic materials (for example, Plasmid DNA). This is essentially due to size and morphology differences with genetic material generally being much larger. The most common method of protein purification involves the use of Chromatography. A protein containing solution is passed through a bed of adsorptive media to which the desired protein to purify becomes bonded to, while other materials in the solution do not (the "binding" process). This is generally followed by passing a second solution through the media which acts to free the captured proteins (the "elution" process), producing a concentrated solution of the desired proteins.

While the same Chromatography process is typically used for the very large gene therapy biomolecules and viral vectors (hereinafter "gene therapy agents"), the media used in columns (for the smaller proteins) is not always appropriate due to the size and morphology differences mentioned. Typical protein purification media consists of nano-porous beads with the bead diameter being in the range of 10-100 microns but pores in the 5~20 nanometer range. The purpose of the nano pores is to greatly increase the total surface area of the media, enabling higher adsorptive capacity of the target proteins. This attribute is called the "binding capacity" of the media.

The larger gene therapy agents do not have access to this nano-porous surface area used in conventional nano-porous media, as they are too big to fit into the nanopores of the media. In fact, it is a hinderance as there is the opportunity to be physically caught up the media matrix rather than chemically bound leading to poor elution and ultimately fouling of the media. Polymeric monoliths for chromatography allowed for higher velocities over that of beds packed with beads as they were not subject to increased compression and subsequent flow restriction due to higher differential pressures across the bed. Monoliths are more rigid and do not compress at all or only slightly. The initial focus was on developing monolithic structures which had pore sizes in the nanometer range and subsequent high internal surface areas. However, as the need for purification of much larger biomolecules for gene therapy developed, such structures are limiting as their pores are too small.

Polymeric Monoliths have been developed which are microporous with pores sizes in the single digit micron range and higher. Generally, these materials are made by polymerization processes with the aid of pore forming agents and cross-linking monomers, or both. Another method involves injecting molten polymers blended with pore forming agents which are later removed. The pore size and void volume of such monoliths is determined by a number of processing parameters. While these monoliths are suitable as substrates for a number of chromatographic processes, including the purification of large biomolecules, it is often difficult to control the pore size and the void volume fraction or porosity (hereinafter porosity). In addition, the materials are often quite fragile, difficult to form to exacting dimensions, requiring cutting to size and frequently losing integrity due to cracking or breaking. Finally, these processes can often result in a close cell structure with isolated, unconnected pores, which is practically useless for the adsorptive processes of interest in the purification of gene therapy agents. As described above, polymeric monoliths fabricated by polymerization and injection molding can suffer from volumes of trapped pores, leading to non-uniform residence times and consequently poor asymmetry.

SUMMARY OF THE INVENTION

Polymeric Monoliths have been developed which are microporous with pores sizes in the single digit micron range. Generally, these materials are made by polymerization processes with the aid of pore forming agents and cross-linking monomers, or both. Other methods involve injecting molten polymers blended with pore forming agents which are later removed. The pore size and void volume are determined by a number of processing parameters. While these monoliths are suitable as substrates for a number of chromatographic processes, including the purification of large molecules, it is often difficult to control the average pore size and porosity. In addition, the materials are often quite fragile, difficult to form into exacting dimensions, requiring cutting to size and frequently losing integrity due to cracking or breaking. Finally, these processes can often result in a closed cell structure with isolated, unconnected pores.

Therefore, there exists a need for a simple and reliable process to fabricate polymeric monoliths that are microporous (pores in the range of about 0.5 to 10 μm), with high porosities of 50~80 percent, relatively high internal surface area, and highly uniform morphology, that can be made with different polymers, that are sufficiently rigid and robust to enable fabrication of a chromatographic cassette and can be readily fabricated to any desired dimension. Such a monolith is ideally suited for the chromatographic purification of large molecules and viruses.

In one embodiment, a monolithic microporous substrate (also referred to as a monolith) includes a microparticulate solid having an average pore diameter from about 0.5 to about 10 µm, a porosity of about 50 to about 80 percent and a thickness greater than 1.0 mm. In a further embodiment, the microparticulate solid is a microparticulate powder having an average particle diameter of about 1.0 µm to about 50 µm and in a still further embodiment, the microparticulate powder has an average particle diameter of about 5 to about 10 µm.

In another embodiment, the microparticulate solid includes polymeric microfibers having an average diameter of about 0.2 µm to about 8 µm and an average aspect ratio of about 10 to about 1000. In a further embodiment, the polymeric microfibers have an average diameter of about 0.5 to about 4 µm. In another embodiment, the microparticulate solid is a mixture of a microparticulate powder having an average particle diameter of about 1.0 µm to 50 µm and a polymeric microfiber having an average diameter of about 0.2 to about 8 µm and an average aspect ratio of about 10 to about 1000 and in a further embodiment, the microparticulate powder includes up to about 50 percent of a total solid volume of the monolithic microporous substrate.

In another embodiment, a monolith having an average pore size of about 0.5 to about 3 µm and a porosity of about 55 percent to about 70 percent is fabricated; and the microparticulate solid includes stacked nonwoven webs of polymeric microfibers wherein the stacked nonwoven webs of polymeric microfibers have an average diameter of about 0.2 µm to about 8 µm and the stacked nonwoven webs of polymeric microfibers are sintered. The stacked nonwoven webs of polymeric microfibers are convectively sintered in another embodiment.

In another embodiment the monolithic microporous substrate of claim 1, further includes a housing where the monolithic microporous substrate is bonded to the housing to form a chromatographic cassette and where the chromatographic cassette has a height equivalent of a theoretical plate (HETP) lower than about 400 µm and an asymmetry of about 0.9 to about 2 at a bed superficial velocity of about 1.0 cm/min a measured with an unretained tracer. In still other embodiments the chromatographic cassette has an HETP lower than about 200 µm, in still other embodiments lower than 100 µm, and in still further embodiments lower than about 50 µm.

One technique for making a polymeric monolithic microporous substrate includes: air-laying a microparticulate solid into a mold of predetermined dimensions including: dispensing the microparticulate solid on a screen, fine screen or sieve; sifting the microparticulate solid through the screen and into a mold forming a dry bed of microparticulate solid greater than about 1.0 mm thick, compressing the dry bed of microparticulate solid in the mold such that the dry bed of microparticulate solid has a porosity greater than 50 percent; and sintering the dry bed of microparticulate solid in the mold at a temperature below a melting point of the microparticulate solid to form a monolithic microporous substrate having an average pore size from about 0.5 µm to about 10 µm, a porosity of 50~80 percent and a thickness greater than 1.0 mm. In a further technique, the microparticulate solid is one of: thermoplastic micro-powders, thermoplastic microfibers and combinations thereof. In another technique, the monolithic microporous substrate has a pore size from about 1.0 µm to about 5 µm.

In yet another technique, sifting the microparticulate solid includes one or more of: scraping the screen with a brush, vibrating the screen, spraying the screen with an antistatic agent, electrifying the screen to voltages exceeding 5000 volts with the mold grounded and/or blowing an ionized air stream under a fine screen. In a further technique, the monolithic microporous substrate is cut to a desired dimension by one of: laser cutting, water-jet cutting, cutting with a knife, abrading or sanding a face of the monolithic microporous substrate and combinations thereof.

Another technique for making a monolithic microporous substrate includes: dispersing a microparticulate solid in a liquid to form a slurry, wet-laying the dispersed microparticulate solid into a mold including: adding the dispersed microparticulate solid into a slurry reservoir having a mold of predetermined dimensions, the mold further including a slurry filter to enable the liquid in the dispersed microparticulate solid to filter out of the mold while retaining the microparticulate solid, building a packed bed of dispersed microparticulate solid having a thickness greater than 1.0 mm, compressing the packed bed of microparticulate solid in the mold to a porosity greater than 50 percent, drying the packed bed of microparticulate solid and sintering the packed bed of microparticulate solid in the mold to form a monolithic microporous substrate having an average pore size of about 0.5 to about 10 µm, a porosity of about 50 percent to about 80 percent and a thickness greater than 1.0 mm. In a further technique, the microparticulate solid is a thermoplastic microfiber with an average diameter of about 0.2 to about 8 µm. In a still further technique, the microparticulate solid is a mixture of a microparticulate solids having a particle size of about 1.0 to about 50 µm and a plurality of microfibers having an average diameter of about 0.2 to about 8 µm. In a still further technique, the liquid used to disperse the microparticulate solid includes additives to aid in the dispersion of the microparticulate solid, including at least one of: nonionic surfactants, anionic surfactants and cationic surfactants.

A further technique includes filtering of the liquid in the dispersed microparticulate solid; and the filtering of the liquid in the dispersed microparticulate solid is induced by one of: a vacuum applied downstream of the slurry filter of the mold, a pressure applied to the slurry reservoir of the dispersed microparticulate solid and gravity. In another technique, the monolithic microporous substrate is cut to a desired dimension by one of: laser cutting, water-jet cutting, cutting with a knife, abrading or sanding the faces and combinations thereof.

Another technique for sintering porous structures includes: providing a mold for sintering microparticulate solids; dispensing a bed of microparticulate solids into the mold;

compressing the bed of microparticulate solid; and convectively sintering the compressed bed of microparticulate solids. In a further technique, convectively sintering includes inducing a hot gas to flow through the compressed bed of microparticulate solids, where the hot gas flow is induced by either connecting a vacuum source to an effluent port and placing the mold in a hot oven or pumping compressed hot gas through an inlet port. In a further technique, dispensing a bed of microparticulate solids into the mold includes stacking at least two layers of a non-woven web or a microporous membrane into the mold.

Embodiments disclosed herein leverage the process of sintering, also referred to as solid state bonding, to achieve a monolith having the above-mentioned desirable properties. As used herein, sintering is defined as the process of heating a particulate solid below its melting point, so as not to melt, but causing it to fuse at contact points into a solid but porous mass, as well as anneal in the compressed state. The degree of sintering can be adjusted so that the particulate bonding is robust, readily apparent and visible, or limited to small contact points between the particulate materials, with weak and tenuous bonds which are not readily apparent but nevertheless serve to maintain a coherent and sufficiently rigid structure. By solid state bonding, fusing or sintering of microparticulate solids, a process has been developed which can produce monoliths with single digit micron pore sizes and porosities in the 50 percent-80 percent range. Microparticulate solids include thermoplastic microparticulate powders whose particle diameter is between about a few tenths of a micron to about 20 microns (hereafter micro-powders or thermoplastic micro-powders) or microfibers, thermoplastic or not thermoplastic, polymeric or not polymeric (e.g., ceramics, carbon) having a diameter of about 0.2 μm to about 10 μm (hereafter microfibers). Because these monoliths are fabricated from micro-powders or microfibers, the internal surface area is relatively high. Because the particles/fibers are bonded to adjoining particles by sintering, the material is relatively rigid, and all pores are interconnected. While it may be difficult to sinter high porosity parts to exacting dimensions, the monoliths disclosed herein lend themselves to cutting, sanding, etc. by a variety of methods while remaining integral, enabling the final monolith to be made to precise dimensions. All six surfaces of a rectangular solid may be sanded, particularly the four sides around the two large planar faces. High porosity large surface area monoliths are also well suited for ultra-high efficiency filtration of gases as well as coarse (above 1.0 micron) liquid filtration media.

One objective is to provide a monolith with very good chromatographic performance which can be produced using powders and air laying techniques. One process includes sintering thermoplastic micro particulates in a metal housing using metal frits to uniformly distribute a controlled temperature gas flow to produce a highly porous, highly uniform device with single digit micron pores. The gas flow can be initiated by an external vacuum or a pressurized hot gas. This mode of sintering is also referred to as "convective sintering."

While polymeric monoliths have been in use for a long time and many such products are commercially available, none have the properties required for high resolution chromatography in viral purification: high porosity in the range of 50-80 percent, pore size of 0.5 to 10 μm with the associated higher surface area, uniform pore structure in every x/y-plane (i.e., (planes parallel to planar surfaces of rectangular monoliths) and mechanical robustness. A microporous polymeric monolithic substrate is made, in one embodiment, by sintering microparticulate solids suitable for the purification of viral vectors. Sintered microporous polymeric monolithic substrates are robust and capable of being fabricated into chromatographic cassettes reliably and reproducibly.

BRIEF DESCRIPTION OF THE DRAWINGS

The foregoing and other aspects, embodiments, objects, features and advantages of the present teachings can be more fully understood from the following description in conjunction with the accompanying drawings. In the drawings, like reference characters generally refer to like features and structural elements throughout the various figures. The drawings are not necessarily to scale, emphasis instead being placed upon illustrating the principles of the present teachings. The following drawings are illustrative of embodiments of the invention and are not meant to limit the scope of the invention as encompassed by the claims.

DETAILED DESCRIPTION OF THE INVENTION

The embodiments disclosed herein are directed to polymeric monoliths having desirable chromatographic properties including but not limited to very uniform fluid velocity through the media bed, uniform pore size distribution and high surface area. Solid state bonding of microparticulate powders (hereafter micro-powders) at temperatures below the melting point of the material comprising the micro-powder, is a process that can produce monoliths with pore sizes of a few microns and porosities in the 50 percent-70 percent range. Because monoliths are fabricated from micro-powders, the internal surface area is relatively high. Because all particles are bonded to adjoining particles by sintering, the monolithic microporous substrate is cohesive, rigid, and all pores are interconnected. While it may be difficult to sinter high porosity parts to exacting dimensions, the monoliths disclosed herein lend themselves to cutting, sanding the faces, etc. by a variety of methods while remaining cohesive, enabling the final monolith to be made to precise dimensions.

Figure 1:
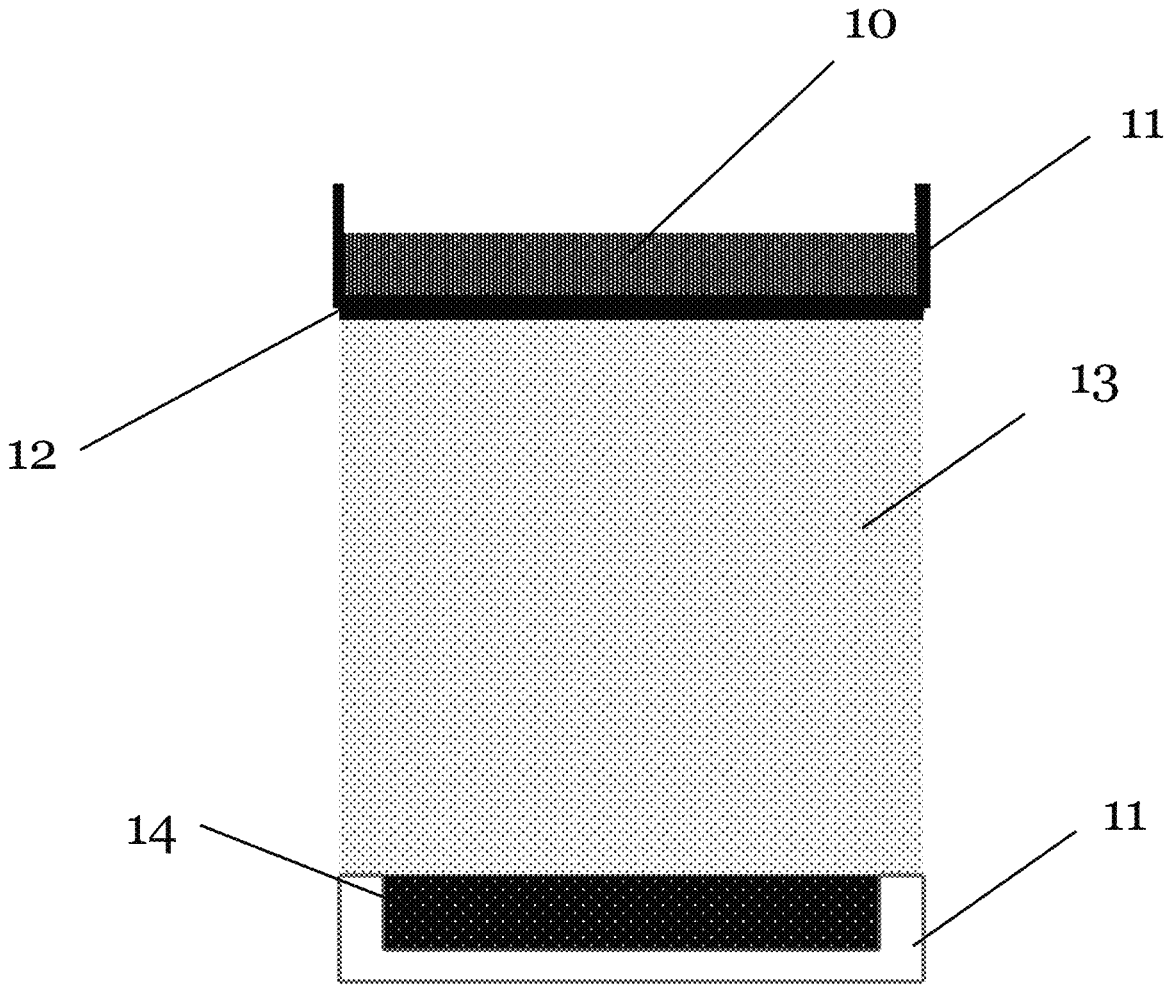
FIG. 1 is a schematic diagram of the air laying process for making a micro-powder-based monolith according to one embodiment of the invention disclosed herein.

FIG. 1 is a schematic diagram of an air laying process. Microparticulate solid 10 is placed in hopper 11. Sifting microparticulate solid 10 drives it through screen 12 to form a suspended powder cloud 13, which falls uniformly into mold 11 to form a dry bed of low porosity microparticulate solid bed 14. Bed 14 is then compressed with suitable plunger and assembly (not shown) and placed in an oven (not shown) for sintering.

In order to achieve a high-porosity sintered part, the starting raw polymeric material must have a very low apparent density, at most 25 percent of the density of the solid polymer itself. For example, the polymer Polyvinylidene fluoride (PVDF) has a solid density of 1.78 g/cc. The apparent density of an about 1.0 to about 10 micron PVDF powder (Kryptonar™ PVDF Powder Coatings—Nile Polymers—Centerville UT), using air-laying techniques, can be as low as 0.27 g/cc, or about 15 percent of the solid density of PVDF. Air laying involves the sifting or brushing of power through a fine screen into a mold below, leading to a highly uniform bed 14 of very low density as shown FIG. 1. Air laying is accomplished, in some embodiments, by suspending in air a micro-powder in an enclosed area and allowed to fall into a mold by gravity. Various methods may be used to aid in the air laying step to disperse the microparticulate solids and reduce agglomeration; in some embodiments the screen may be electrified to high voltages of 5000 volts and higher; in other embodiments an ionized air stream is blown over the micro-powder to reduce the surface charges that cause microparticulate solids to aggregate.

If the material does not have this low apparent density, it can be reduced using the various methods known in the art. One skilled in the art can develop the correct processing parameters for a specific polymeric material. When the powder has a sufficiently low apparent density, the process of air-laying a microparticulate solid into a mold of predetermined dimensions continues. Generally, for air laying the requirements include an open face mold with a well that is fully accessible to the suspended powder cloud 13, for example, a two-dimensional mold having a well (e.g., a cavity with walls perpendicular to the planar surface of the mold) with a third dimension being thickness.

The powder bed formed in the mold by the air laying process is then sintered. In this process the powder in the mold is heated to its sintering temperature with minimal compressive force applied, at which point bonding takes place, forming sintered bonds at powder contacting points. In some embodiments a small compressive force can be applied by placing a plate (hereinafter a sinter plate) on top of the air-laid bed. The air-laid bed can be leveled prior to placing the sinter plate in order to obtain a sintered monolith with a uniform thickness. The leveled sintering plate has dimensions slightly smaller than the mold opening (mold clearance) to allow it to sink deeper into the mold with shrinkage of the air-laid powder bed during sintering. Sintering with a leveled sinter plate also inhibits shrinkage in the mold planar dimensions except the one to perpendicular to the sinter plate.

In the air laying process, selection of screen size, elimination of static charge, height of screen above mold and other factors related to the suspension of the fine powders in air are critical in sifting the microparticulate solid to form the uniform powder dry bed of microparticulate solid. Using ionized air can reduce charge between powder particles, leading to a less dense powder bed. Spraying the screen with antistatic agents or electrifying the screen can further assist in uniform dispersion. Finer screen mesh size reduces the size of agglomerations of powders.

In some embodiments polymeric staple or short-cut fibers can be wet laid into thick cakes or beds, dried and sintered to form a fiber-based monolith. Wet laying is the process of suspending fibers in an aqueous dispersion and then filtering the dispersion through a screen on which the fibers are collected in a highly uniform manner to build a fiber bed. Once dried, the fiber bed is processed in the same manner as the powder bed. Polymeric microfibers are characterized by their diameter and their length. In monoliths made with wet-laid microfibers the aspect ratio of the microfiber determines how readily the microfibers can be dispersed. By aspect ratio, as used herein, is a fiber length-to-diameter ratio, a dimensionless number. In some embodiments staple fibers have diameters between 0.2 and 10 μm and aspect ratios of 20~1000; in other embodiments the staple fibers have a diameter of 0.5 to 3 μm and aspect ratios of 50~500.

In some embodiments the monoliths have a thickness of about 50 to 200 mm; in other embodiments between about 15 and 60 mm; in other embodiments between about 5 and 20 mm and in still other embodiments between about 1.0 and 10 mm. In some embodiments the footprint of the monoliths can be quite small, less than one $cm^2$ of cross-sectional area; in other embodiments it can be between about 1.0 and 5.0 $cm^2$; in other embodiments can be about five to about 20 $cm^2$; in other embodiments can be about 20 to 100 $cm^2$, and in still other embodiments can be 1000 $cm^2$ and larger. Footprints can be rectangular, circular or any desired geometrical shape.

The degree to which a compressive force is applied to the microparticulate powder or staple microfiber bed will determine the final thickness and density of the sintered monolith for a given sintering cycle. The degree to which the compressed bed shrinks during sintering is necessarily a function of the material of the microparticulate solid, the sintering conditions, time and temperature, and will change depending on the pre-sintered density and thickness of the bed.

Figures 2A, 2B, 2C:
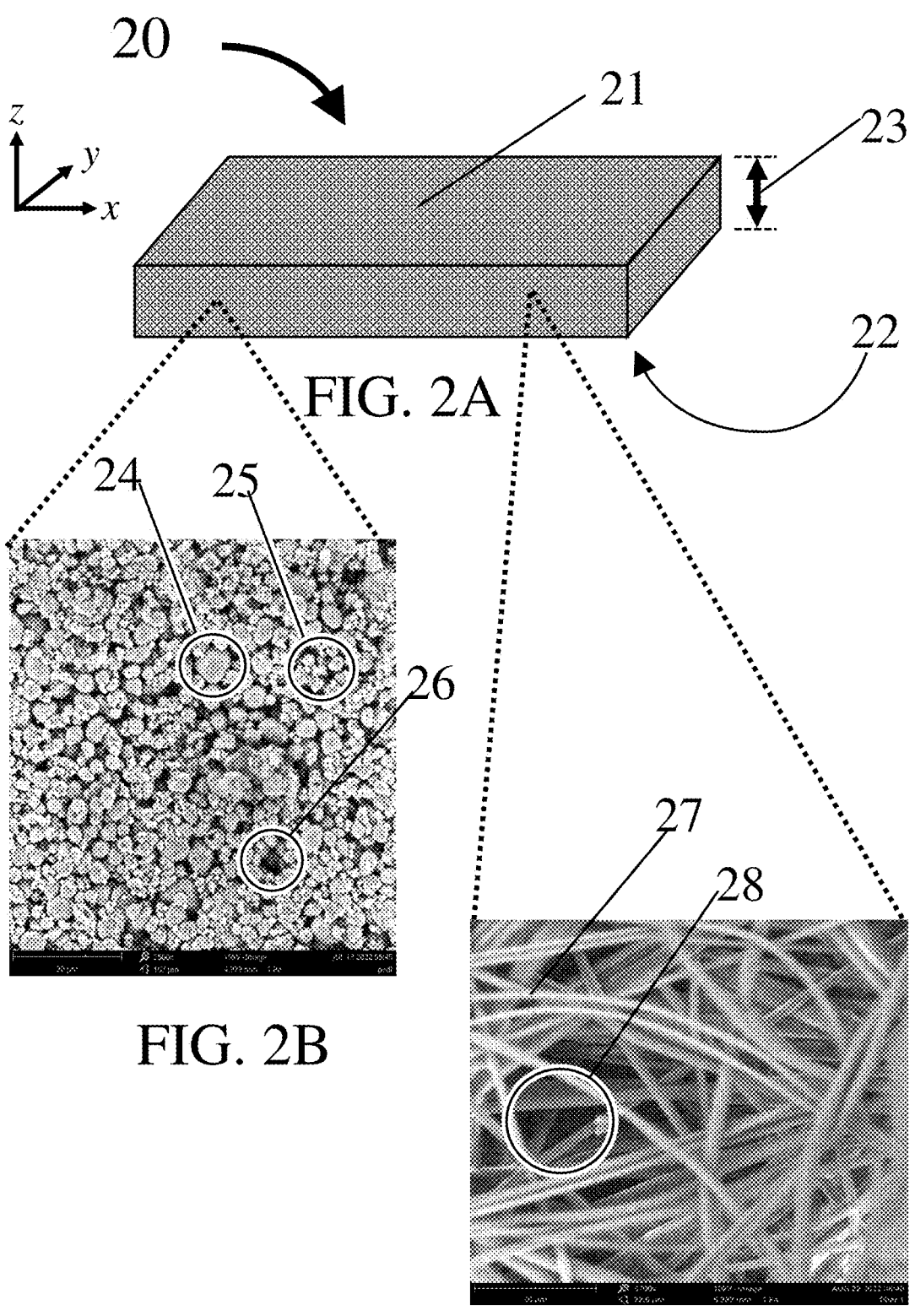
FIG. 2A is a schematic diagram of a monolithic microporous substrate, according to one embodiment of the invention disclosed herein.
FIG. 2B is a scanning electron microscope (SEM) photo of a micro-powder-based sintered polymeric monolith according to one embodiment of the invention disclosed herein.
FIG. 2C is a scanning electron microscope (SEM) photo of a microfiber-based sintered polymeric monolith according to one embodiment of the invention disclosed herein.

Referring to FIG. 2A, microporous monolithic substrate 20 is a rectangular solid with top planar surface 21, bottom planar surface 22 and thickness 23. In use, flow is directed in the z-axis along the thickness 23 of microporous monolithic substrate 20. Microporous monolithic substrate 20 has a porosity (or pore volume fraction) of about 50 to 80 percent and an average pore size of about 0.2 to 8 μm.

FIG. 2B is a magnified view of the microporous structure of a microporous monolithic substrate 20 comprising micropowders. The micro-powders have a range of diameters. Microparticle 24 has a diameter of about 10 μm, whereas microparticles 25 have diameters of about 1.0 to 3 μm. Pores are formed by the void space between the microparticles. For example, pore 26 is larger than most of the pores of the microporous structure, slightly smaller than 10 μm in diameter.

FIG. 2C is a magnified view of the microporous structure of a microporous monolithic substrate 20 comprising microfibers. The microfibers forming the microporous structure includes microparticles (also referred to as microfibers) having a very narrow range of fiber diameters. Microfiber 27 has a diameter of about 2 μm. The pores are formed by the void space between the microfibers. Pore 28 is larger than most of the pores of the microporous structure, slightly smaller than 10 μm in diameter.

Figure 3:
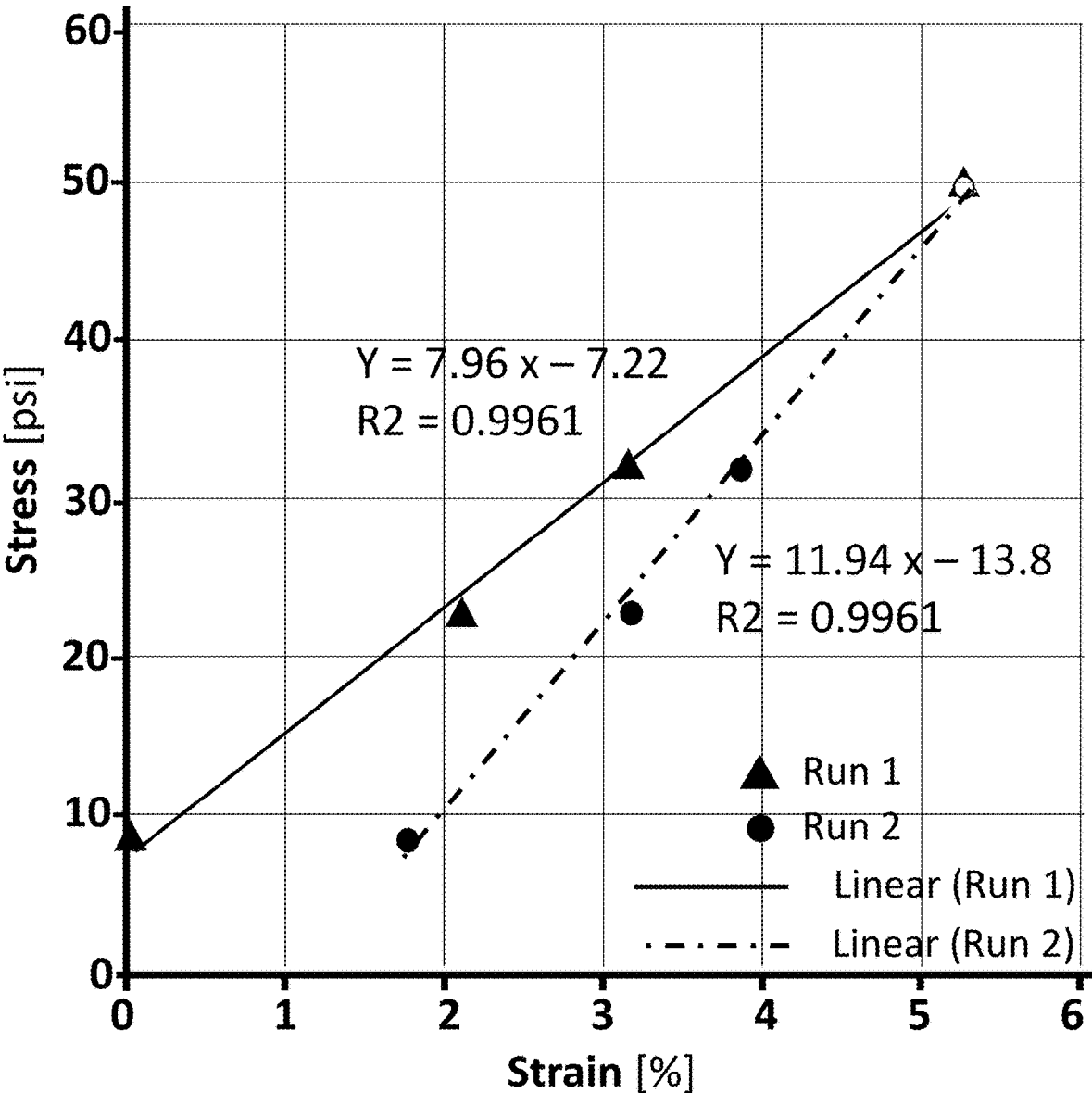
FIG. 3 is the Stress vs. Strain plot of a wet monolith made with PVDF micro-powder.

Microporous monolithic substrate 20 is robust and sufficiently rigid to enable fabrication of a device with a compressive modulus greater than about 50 psi; in some embodiments the compressive modulus is greater than 500 psi; in still other embodiments greater than 1000 psi. FIG. 3 shows the Stress vs. Strain plot of a wet monolith made with PVDF micro-powder. Compressive plot 31 is obtained when compressing from low to high loads, whereas compressive plot 32 is the "return" path when decompressing from high to low loads. This is typical of a porous solid that exhibits some consolidation, in this case irreversible. Note that in one example the compressive modulus is 796 and 1194, respectively, for the increasing vs. the decreasing load curves (the modulus is the slope of the line multiplied by 100 since the horizontal axis is in percent).

Average particle diameter, pore diameter and fiber diameter as used herein is the mean volume-fraction-weighted-average diameter, $\langle D \rangle$ :

$$\langle D \rangle = \frac{\int_0^\infty V_{(D)} \cdot D \cdot d(D)}{\int_0^\infty V_{(D)} \cdot d(D)}$$

where $V_{(D)}$ is the volume of the particle, pore or fiber as a function of diameter, and D is the diameter.

Average aspect ratio is the number-average aspect ratio, $\langle R \rangle$ :

$$\langle R \rangle = \frac{\int_0^\infty R \cdot d(D)}{\int_0^\infty d(D)}$$

Figure 7:
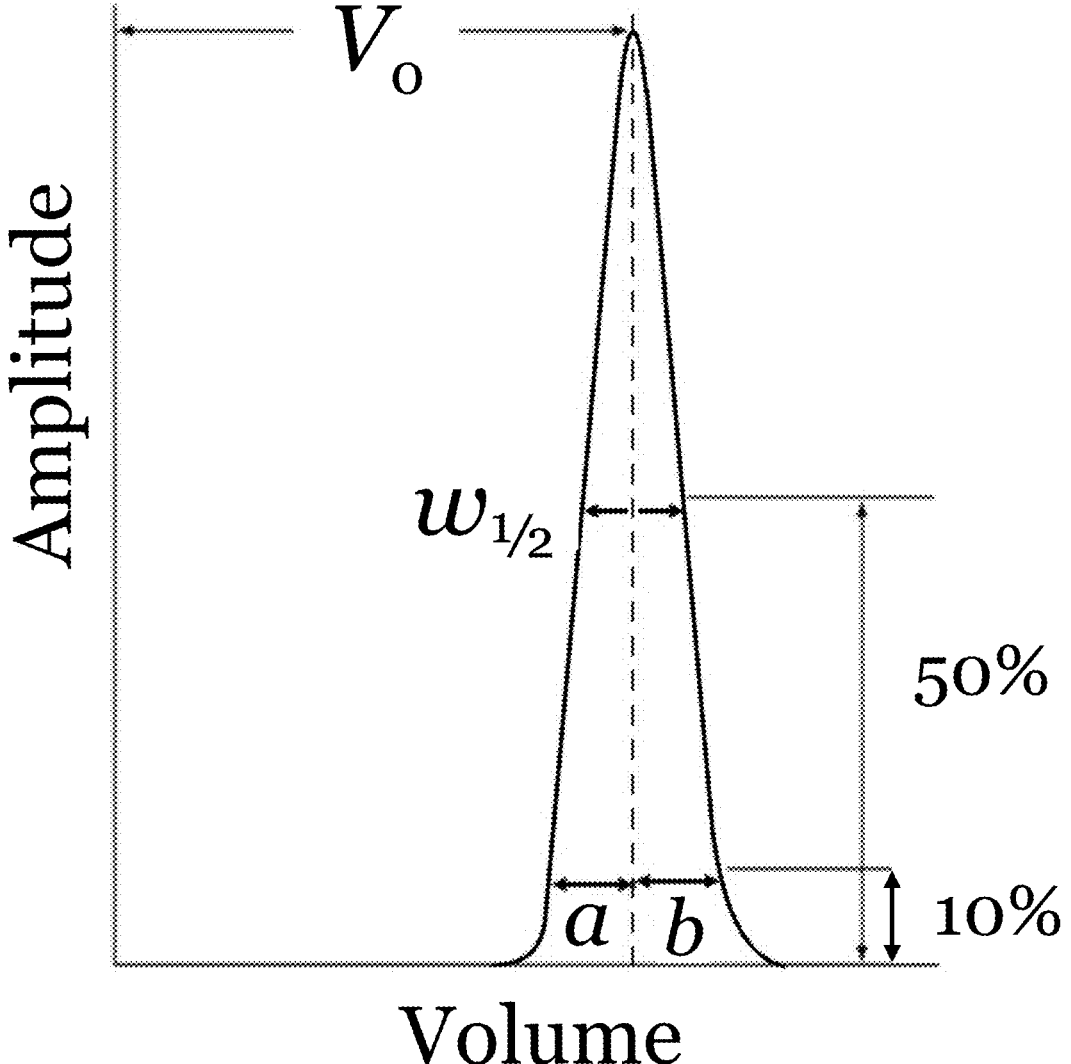
FIG. 7 is a diagram of a chromatographic peak showing the measurements made to characterize the chromatographic dispersion of the device according to one embodiment of the invention disclosed herein.

In Chromatography, the uniformity (or integrity) of the bed is measured in a dynamic way by performing a standard integrity test for measuring the chromatographic dispersion of the chromatographic device, well known to those skilled in the art. Using a chromatograph, the chromatographic device is subject to flow of a liquid solution while some property of the effluent is monitored (e.g., conductivity, or UV absorbance). A small dose, a "pulse," of a dissimilar solute, a "tracer," which is not retained by the media comprising the bed, referred to by those skilled in the art as an "unretained tracer," is then injected into the fluid flow entering the chromatographic device and the resulting change in the fluid property is recorded in the form of a peak. For example, the solution concentration might be 0.1 M (Moler/liter) NaCl in water and the tracer might be 1 M NaCl in water. The shape of the resulting peak can be analyzed and assigned a plate count and an asymmetry value, as shown in FIG. 7 which is a diagram of a chromatographic peak showing the measurements made to characterize the chromatographic dispersion of the device. If the Bed Height, H is Known, then the Height Equivalent of a Theoretical Plate, HETP, of the Chromatographic Bed can be Determined as Follows:

$$N = 5.54 \cdot \left( Vo/W_{\frac{1}{2}} \right)^2 \tag{1}$$

$$HETP = H/N \tag{2}$$

$$As = b/a \tag{3}$$

An asymmetry value of 1.0 represents a "perfect" peak with the upslope and down slope being mirror images. An asymmetry value of less than 1.0 is indicative of some area(s) of the bed allowing higher velocity (i.e., by-pass) while an asymmetry of greater than 1.0 indicates area(s) of lower flow. A low HETP is a measure of low chromatographic dispersion; uniform beds have low HETPs and Asymmetry close to one. In some embodiments the polymeric monoliths have HETPs of less than 400 μm, in other embodiments less than 200 μm, in other embodiments less than 100 μm, and in still some embodiments less than 50 μm. In some embodiments the polymeric monoliths have Asymmetry between 0.8 and 2; in other embodiments between 0.9 and 1.6; and in still some embodiments between 1.0 and 1.3.

While the functional integrity test just described is how end-users determine if the chromatographic device is performing well, the factors that drive good chromatographic performance is the uniformity of the porous structure as well as dispersion that occurs in the distributors driven by high extra-bed volume and poor distribution of the mobile phase, hereafter extra-bed dispersion, as is well known to those skilled in the art. As stated above, pore size gradients in the z-axis of the polymeric monolith are tolerable, but those within the x/y-plane are much less so. Therefore, the pore size uniformity in every x/y-plane of the polymeric monolith is important. Pore size uniformity is defined as the coefficient of variation of the distribution of pore diameter, hereinafter pore size, CV, defined as the standard deviation of the pore size distribution, SD, divided by the average pore diameter, $\langle d_p \rangle$ (also referred to as pore size):

$$CV = SD/\langle d_p \rangle \qquad (4)$$

The measurement of pore size distribution in every plane is in principle simple to describe, but in practice difficult. Furthermore, ultimately what matters is the chromatographic performance, therefore, the uniformity required will be described in terms of the chromatographic integrity test. Microparticulate Solids Based on Microfibers have at Least Two Advantages Over Those Based on Microparticulate Powders:

1. The technology for making fibers results in a very uniform fiber diameter distribution. In contrast, powder generation processes produce a very wide particle size distribution.
2. Microfibers naturally pack at high pore fraction or porosity, enabling the use of wet-lay methods that inherently deposit microparticulate solids more uniformly. In contrast, micro-powders packed using wet-lay methods result in porosity less than 40 percent, which is why it is preferable that micro-powders be dry-laid in order to obtain a porosity greater than 50 percent.

A microfiber, generally, has a diameter between 0.2 and 8 μm. Polymeric microfibers (also referred to as "staple microfibers") are characterized by their diameter and their length. The aspect ratio of the microfiber determines how readily the microfibers can be dispersed in a suitable liquid. As used herein, aspect ratio is a fiber length-to-diameter ratio, a dimensionless number. The lower the aspect ratio the lower the probability of a microfiber becoming entangled with another microfiber, enabling the fibers to be dispersed freely as discrete microfibers in a liquid. The more freely dispersed the microfibers are (i.e., the less entangled and the lower the fraction of fiber "clumps") the more uniform the wet-laid fiber bed will be. This uniformity is a desirable attribute of monolithic microporous substrates (also referred to as monoliths) used for adsorptive applications.

There are several processes for generating microfibers. Electrospinning is used to generate fibers having diameters of about 0.1 to a few microns. Another process is melt-blowing, which can also generate fibers having diameters of about 0.1 to 10 μm. A process for making polyolefin microfibers generates microfibers having a wide distribution of diameters and lengths. Still another microfiber generation process is to spin a very fine composite fiber having a diameter of 10~40 μm in an "Islands-in-the-Sea" ("InS") configuration, wherein the composite fiber includes dozens to hundreds (or even thousands) of "Islands" of the target polymeric microfiber embedded within a "Sea" of a polymer that can be readily removed with further processing. As commercially practiced, electrospinning and blow molding processes generate a non-woven fabric rather than a continuous individual fiber, making them not suitable for the generation of a discrete microfiber. Some embodiments disclosed herein are based on the spinning of InS composite monofilaments.

The diameter of the microfiber in an InS monofilament (also referred to as the "Island") d, depends on the diameter of the composite fiber, D, the number of Islands, n, and the volumetric fraction of Sea-polymer, f (=volume of Sea-polymer divided by the volume of composite fiber). In cases where the microfiber and the composite fiber are both circular and all microfibers have the same diameter, then the diameter, d, is given by Equation (5), $$d = \sqrt{\frac{1-f}{n}} D \qquad (5)$$

Solving for f Yields Equation (6):

$$f = 1 - n \cdot \left(\frac{d}{D}\right)^2 \qquad (6)$$

Therefore, to obtain a microfiber with a diameter of 1.0 μm spinning a composite fiber having a diameter of 25.7 μm, and a Sea-polymer volumetric fraction of 50 percent, requires about 330 Islands. To obtain a ½ μm microfiber with a 25.7 μm composite fiber requires a volumetric fraction of 87 percent and 330 Islands, or 1320 Islands and a volumetric fraction of 50 percent.

Figure 5A:
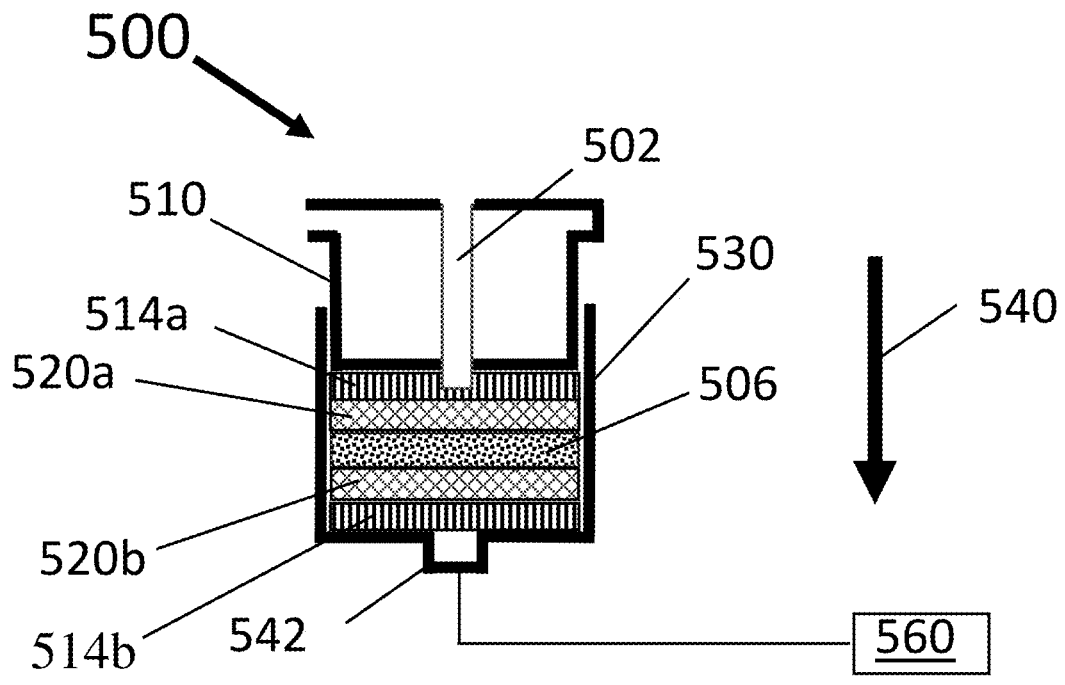
FIG. 5A is a schematic diagram of an apparatus for convective sintering according to embodiments of the invention disclosed herein.
Figure 5B:
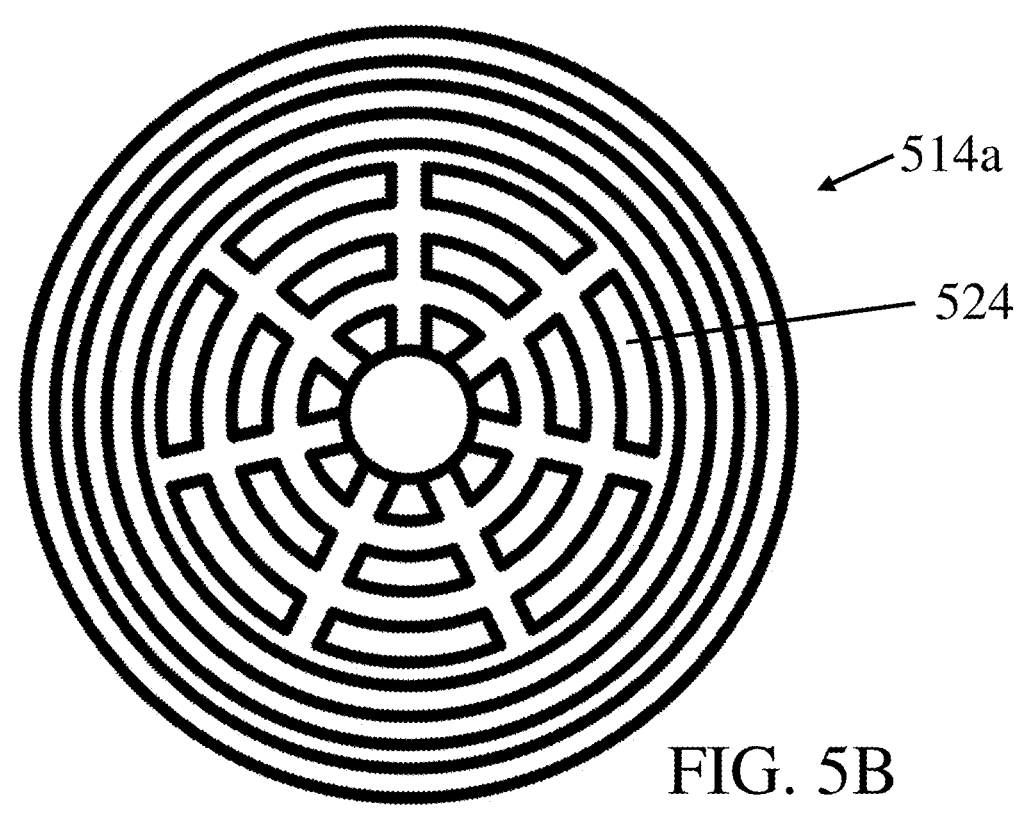
FIG. 5B is a schematic diagram of a top view of an upstream distributor used in the apparatus of FIG. 5A.

Referring now to FIG. 5A an in-situ sintering apparatus 500 is used in one method of sintering (referred to herein as convective sintering). Apparatus 500 provides uniform sintering which is used for producing a sintered chromatographic monolith having a highly uniform porous structure. In one technique, microparticulate solids 506 are dispensed into a mold 530 by air-laying, wet-laying or stacking non-woven or membrane layers to form a high porosity bed, which is then axially compressed with press 510. Porous frits, 520a and 520b (collectively porous frits 520), are used to retain the compressed bed of microparticulate solids 506 while still enabling gas flow through the compressed bed. Flow distributors, 514a and 514b (collectively flow distributors 514), are located upstream and downstream of the flow (indicated by arrow 540) just before and just after the porous frits 520 and the entire assembly is placed into a controlled temperature convection oven (not shown) and connected to a vacuum source 560. The oven is heated uniformly to the sintering temperature of the specific material of the microparticulate solid and flow is initiated using the vacuum source, 560. The heated gas of the oven is pulled from the inlet port 502, through flow distributors 514, frits 520 and compressed bed 516 and exits through outlet port 542 to the vacuum source. The gas type used in the oven will depend on the material being sintered. For most thermoplastics the gas would be air. Referring now to FIG. 5B, flow distributors, 524 of upstream distributor 514a, are shown. The flow distributors 514 and frits (not shown) upstream and downstream of the microparticulate bed, 506 insure a uniform flow of the heated gas in the oven. Parameters (flow rate, temperature and time) are set for sintering a mass of microparticulates solids for a given material. For example, a compressed mass of PVDF micro powders is sintered at 145 degrees C. for 80 minutes in air. For example, a compressed mass of nylon fibers is sintered in an apparatus as shown in FIG. 5A at a flow are of 1.0 liters per minute (L/min) for 70 minutes with air at 135 degrees C.

In some embodiments hot compressed gas would be fluidly connected into feed port 502 to induce hot convective gas flow through the monolith instead of using vacuum source 560; in such embodiments an oven is optional. This process is referred to as convective sintering. In some embodiments mold 530, press 510, porous frits 520 and distributors 514 may be made of metal; in other embodiments ceramic materials; in still other embodiments polymeric materials whose softening temperatures are higher than the sintering temperatures.

Figure 6:
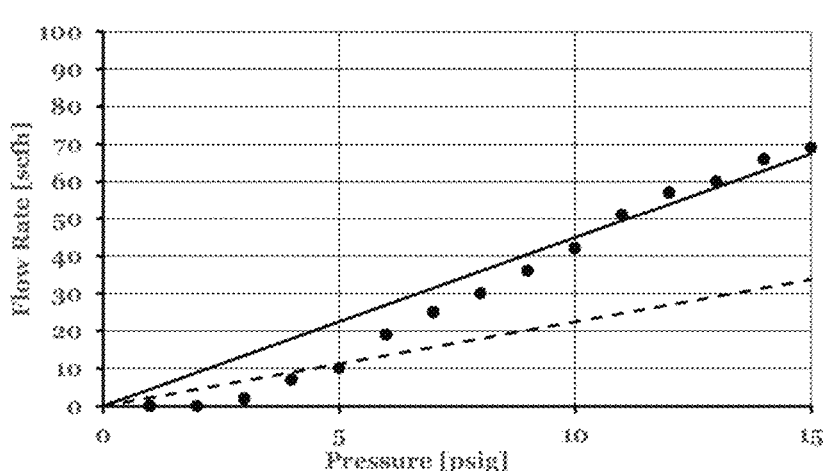
FIG. 6 is a graph of capillary flow test results for 61 percent porous PVDF monolith, according to one embodiment of the invention disclosed herein.

FIG. 6 is a graph of capillary flow test results for 61 percent porous PVDF monolith. A capillary flow test is undertaken per American Society for Testing and Materials (ASTM) D6767. The dry flow curve (represented by the upper line) shows pressure required for air flow through the monolithic material when dry. The wet flow curve (represented by the circular points) shows the pressure required for air flow through the monolithic material when the pores are completely full of a liquid. The ½ dry flow curve (represented by the lower line) is the dry flow curve divided by 2. The pressure at which flow is first detected is the bubble point pressure of the largest pore, the point at which the dry and wet flow curve meet is bubble point pressure of the smallest pore size and the pressure at which the wet flow curve intersects the ½ dry curve is the median bubble point pressure. Pore size based on bubble point pressure is calculated per ASTM F316. For the PVDF Monolith shown in FIG. 6, the largest pore is 3.2 micron, the smallest is 1.0 micron and the median is 1.6 micron.

Figure 8:
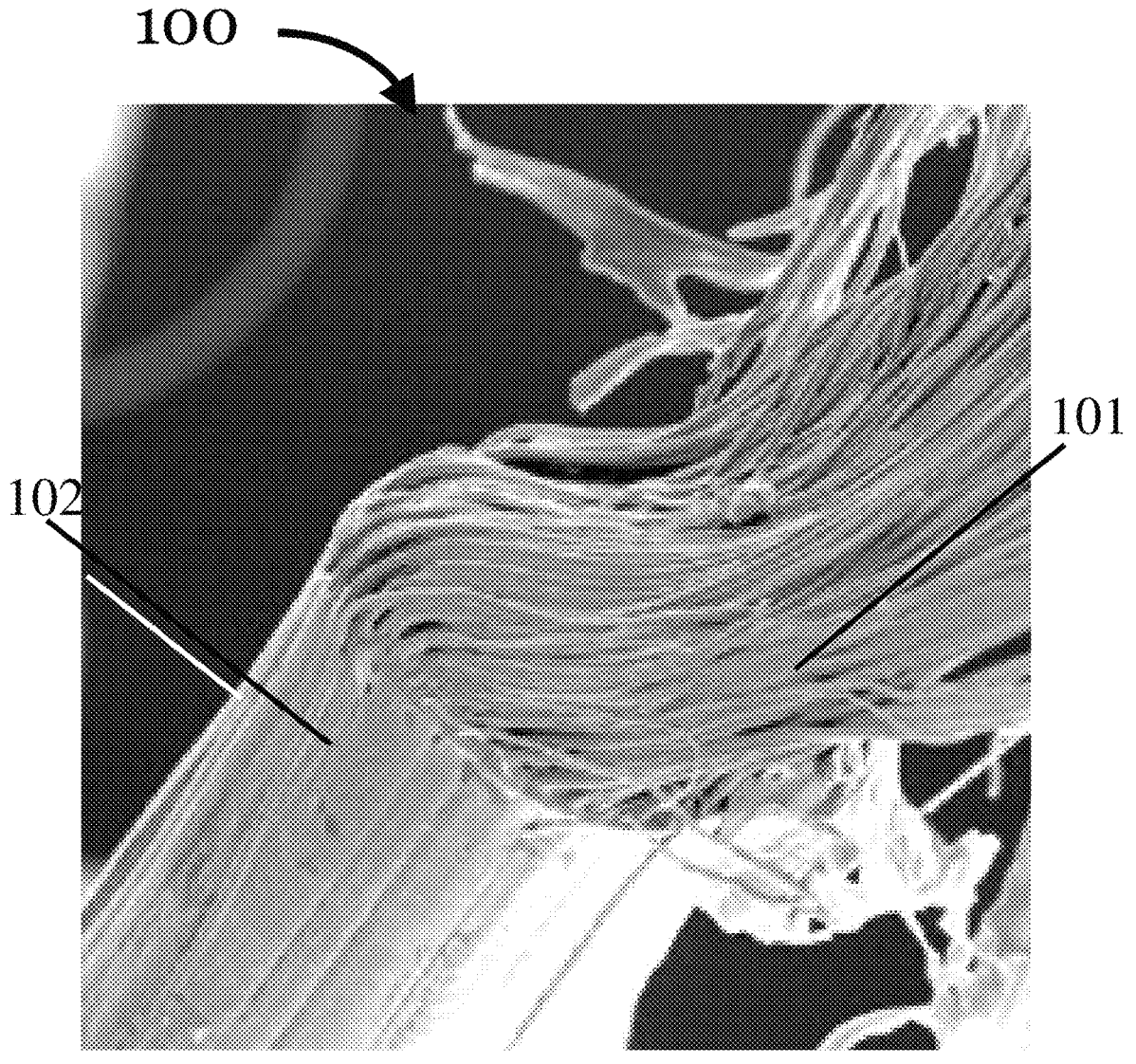
FIG. 8 shows a Scanning Electron Micrograph (SEM) of an "Islands-in-the-sea" InS bicomponent monofilament fiber according to one embodiment of the invention disclosed herein.

FIG. 8 shows a Scanning Electron Micrograph (SEM) of an InS bicomponent monofilament fiber 100 using a standard spinning process with a special spinneret. Bicomponent fiber 100 has a final drawn denier of about 1.0 denier (approximately 10 μm) and includes islands 101 embedded within the monofilament, with the resulting microfibers 102 obtained after dissolving the sea-polymer (not shown because the sea-polymer has already been eroded). In this example, the microfibers have diameters of approximately 0.3 μm. Polypropylene, polyester and nylon have all been used for the island-polymer, with a dissolvable polymer such as PLA or PVA used as the sea-polymer. Any extrudable thermoplastic polymer can be used for the island-polymer and for the sea-polymer. The microfibers produced with this technique have a very narrow diameter distribution (i.e., the diameters are very unform).

Once an InS monofilament fiber is spun, it is then cut into short lengths of a few tenths of a mm or less; such fibers are called staple fibers or flock fibers by those skilled in the art. These short-cut staple fibers include the microparticulate solid that forms the monolith. In some embodiments staple fibers have diameters between 0.2 and 10 μm and aspect ratios of 20~1000; in other embodiments the staple fibers have a diameter of 0.5 to 3 μm and aspect ratios of 50~500; in still other embodiments the staple fibers have a diameter of 0.5 to 3 μm and aspect ratios of 30~100.

Figure 9:
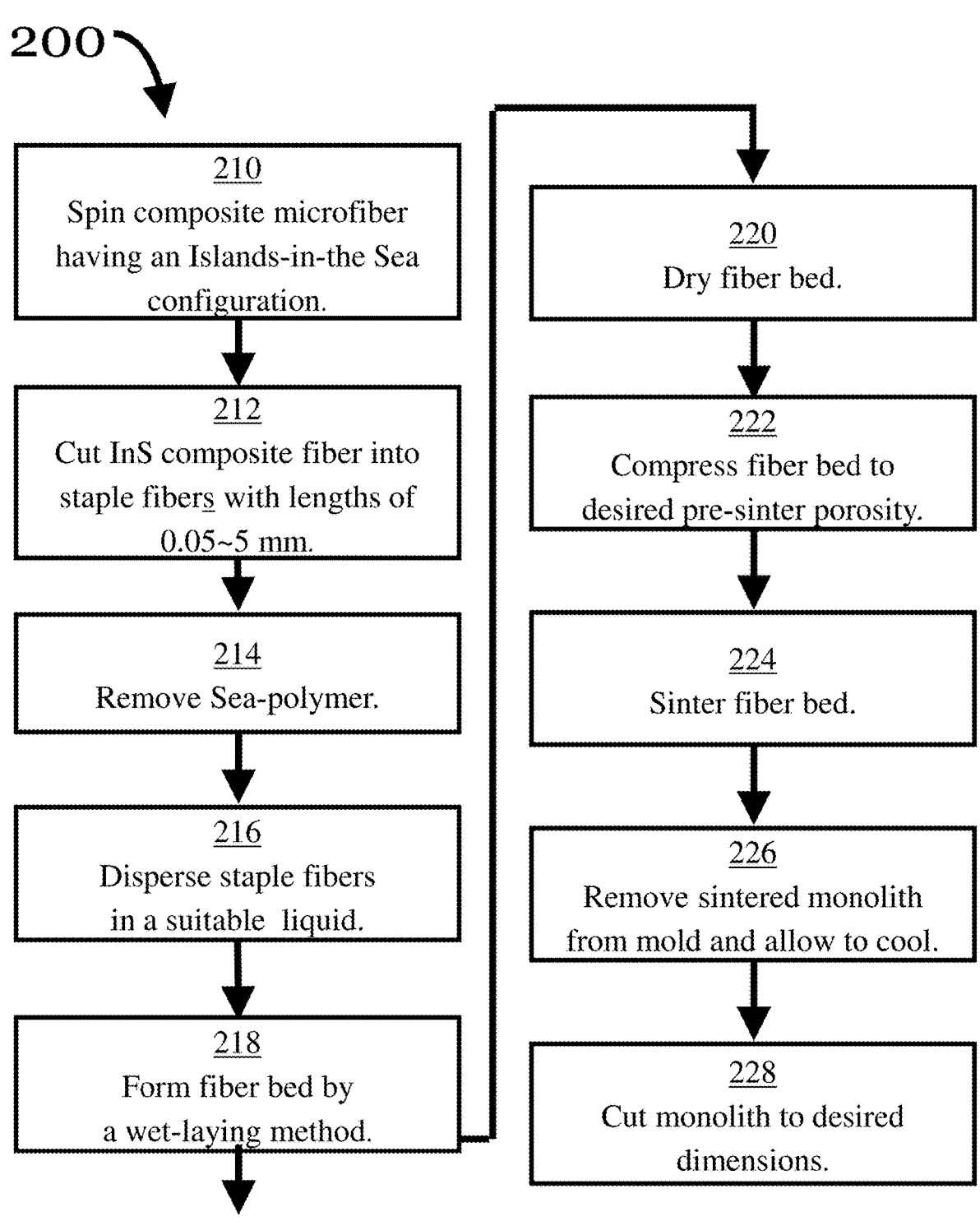
FIG. 9 is a flowchart of a process for making a microfiber-based monolith according to one embodiment of the invention disclosed herein.

FIG. 9 is a flowchart 200 describing a process for making a polymeric monolithic microporous substrate including air-laying a thermoplastic microparticulate solid into a mold of predetermined dimensions. Starting at step 210, the thermoplastic microparticulate solid is dispensed through a screen mounted above a mold. In step 212, the thermoplastic microparticulate solid is sifted through a screen and into a mold forming a dry bed of thermoplastic microparticulate solid. In one embodiment, the dry bed is greater than about 1.0 mm thick, in other embodiments greater than about 3 mm, and in still other embodiments greater than about 10 mm. Different sifting devices can be used as described herein. In step 214, once the mold is full, the top of the bed is wiped with a straight edge to obtain a smooth flat surface at the top of the mold. In step 216 the dry bed of thermoplastic microparticulate solid is compressed in the mold such that in one embodiment, the dry bed of thermoplastic microparticulate solid has a porosity greater than 50 percent. In another embodiment, the dry bed is compressed to a desired thickness within the mold. In step 218, the mold with the compressed dry bed is sintered in the mold at a temperature below a melting point of the thermoplastic microparticulate solid. In one embodiment, a monolithic microporous substrate is formed having an average pore size from about 0.5 μm to about 10 μm, a porosity of 50~80 percent and a thickness greater than 1.0 mm. In one embodiment, the sintering occurs inside an oven at a controlled temperature and time. In step 220 the mold is removed from oven and allowed to cool at room temperature. In step 222 the sintered monolith is removed from mold. Finally, in step 224, the monolith is cut to desired dimensions. Any suitable cutting method that delivers the desired dimensions can be used. In some embodiments a laser cutter is used; in other embodiments a water-jet cutter is used; in still other embodiments a knife is used; in still other embodiments a knife cutter is used.

Figure 10:
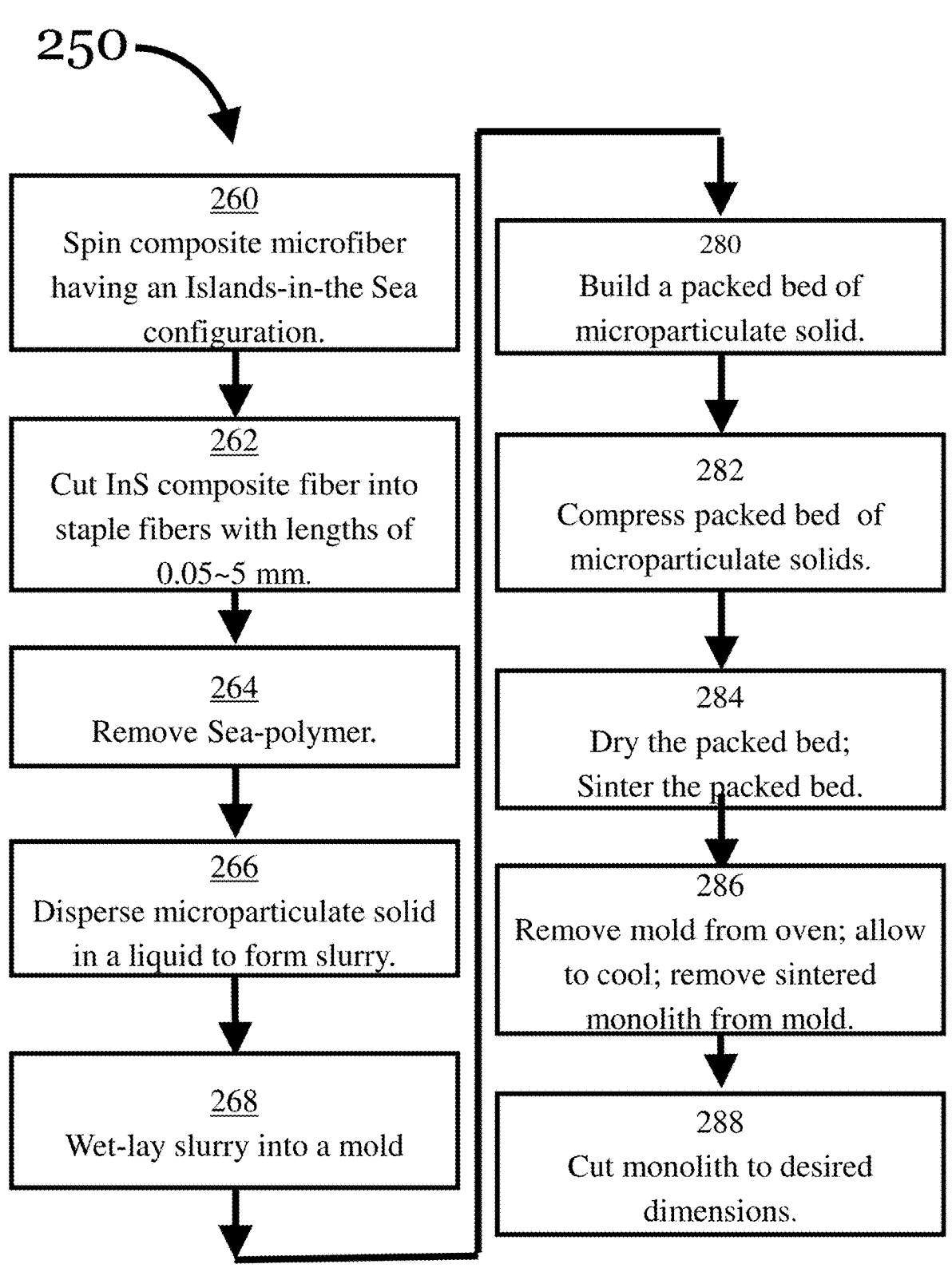
FIG. 10 is a flowchart of a process for making a microfiber-based monolith according to one embodiment of the invention disclosed herein.

FIG. 10 is a flowchart 250 describing a process for a making a microfiber-based monolith according to one embodiment. Starting at step 260, a bicomponent fiber is spun with an InS configuration. In step 262, the spun fiber is cut into staple fibers with lengths of about 0.05~5 mm. In step 264, Sea-polymer is removed. Sea-polymers are selected such that they can be removed without damaging the Islands. In some embodiments polylactic acid (PLA) is used, which can be chemically eroded with acid or base at elevated temperatures of about 40-about 80° C. In other embodiments polyvinyl alcohol (PVA) is used which can be dissolved with water elevated temperatures of about 60° C.—about 100° C. Another suitable Sea-polymer is East-One™ sulfonated polyester (Eastman Chemicals. Any polymer whose melting point and viscosity makes it compatible for co-spinning with the Island polymer, and can be removed without damaging the Island-polymers or the Islands themselves is a suitable Sea-polymer.

In step 266, staple fibers are dispersed in a suitable liquid for example, deionized water (DIW) or a conventional buffer, possibly including some additives and surfactants (e.g., nonionic, anionic and cationic surfactants, collectively referred to as dispersants), to aid in maintaining the dispersed fibers discrete and separated from the other staple fibers. In some embodiments aqueous solutions of an organic solvent may be used, e.g., ethanol, methanol and isopropyl alcohol.

In step 268, a fiber bed is formed by a wet-laying the dispersed microparticulate solid, a method known to those skilled in the art. In some embodiments the solid concentration in the dispersion is lower than 5.0 percent, in other embodiments lower than 1.0 percent, in still other embodiments lower than 0.5 percent and in still other embodiments lower than 0.1 percent. Typically, the lower the solid concentration to more discretely dispersed the staple fibers will be, delivering a bed having a more uniform porosity; on the other hand, the lower the solids concentration the longer it takes to form the wet-laid bed and the more dispersant is used, both undesirable.

In step 280, a packed bed of thermoplastic microparticulate solid bed is built. In step 282, the fiber bed is compressed to a desired pre-sinter porosity. In step 284, the packed bed is dried and sintered. In one embodiment, the packed bed is dried and sintered in an oven. In step 286, when an oven is used, the mold is removed from the oven and allowed to cool to a suitable temperature; once cooled, the sintered monolith is removed from the mold. Finally, in step 288, the monolith is cut to desired dimensions. In one embodiment, the packed bed of thermoplastic microparticulate solid has a thickness greater than 1.0 mm. In one embodiment, the packed bed of thermoplastic microparticulate solid in the mold is compressed to a porosity greater than 50 percent. In one embodiment, the monolithic microporous substrate has an average pore size of about 0.5 to about 10 μm, a porosity of about 50 to about 80 percent and a thickness greater than 1.0 mm. A dispersed microparticulate solid, or a dispersion of microparticulate solid is also referred to as a slurry.

Figures 11A, 11B, 11C, 11D:
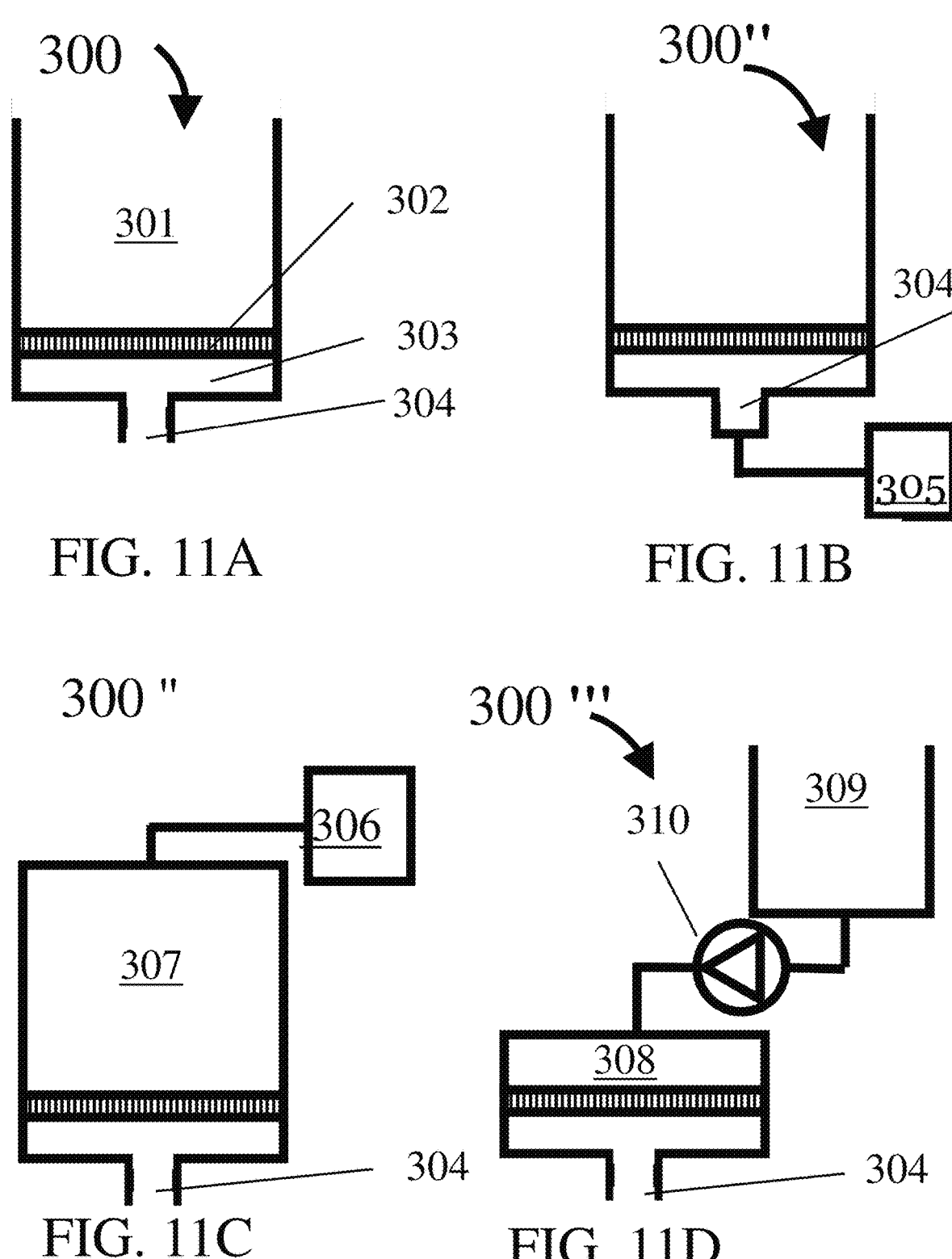
FIGS. 11A-11D are schematic diagrams of various of equipment used for a wet laying processes for making a microfiber-based monolith according to embodiments of the invention disclosed herein.

FIG. 11A is a schematic diagram of an embodiment of a system 300 for a wet-laying process. System 300 includes slurry reservoir 301 open to the atmosphere; slurry filter 302 whose openings are sufficiently small to retain the microparticulate solids suspended in the slurry; filtrate compartment 303 to collect the supernatant of the slurry that flows through slurry filter 302; and effluent port 304, in this embodiment open to the atmosphere. According to this embodiment the supernatant liquid in the slurry is driven through the filter by virtue of the gravitational force exerted on the column of liquid in the slurry dispensed into the slurry reservoir, with the filtrate draining to waste from the effluent port. In use, the feed slurry is dispensed into slurry reservoir 301, immediately starting filtration of the supernatant by virtue of gravity; as the supernatant filters the microparticulate solids are retained by slurry filter 302, gradually building a packed bed of microparticulate solids, hereafter a bed, whose thickness increases as the slurry filters; the filtrate is collected in filtrate compartment 303 from which it drains to waste through effluent port 304. In some embodiments an effluent or drain valve (not shown) is disposed on effluent port 304 to enable the user to fill slurry reservoir 301 without inducing any filtration, the filtration being induced by the operator opening the drain valve. It is understood that slurry filter 302 at the bottom of slurry reservoir slurry filter should be flat and smooth to obtain a bed with a smooth and flat bottom.

An alternative embodiment of a wet-laying system 300' is shown in FIG. 11B, wherein the filtration of the supernatant is driven by fluidly connecting a vacuum source 305 to effluent port 304. By creating a vacuum on filtrate compartment 303 the filtration of the slurry can be sped up.

An alternative embodiment of a wet-laying system 300'' is shown in FIG. 11C, where the filtration of the supernatant is driven by fluidly connecting a compressed gas source 306 to a slurry reservoir 307, while having the filtrate compartment 303 at atmospheric pressure. By pressurizing slurry reservoir 307 the filtration of the slurry can be sped up.

Another alternative embodiment of a wet-laying system 300''' is shown in FIG. 11D, wherein the filtration of the supernatant is driven by pumping the slurry with slurry pump 309 into a lower-volume slurry reservoir 308, while having the filtrate compartment 303 at atmospheric pressure. Pumping the slurry enables its filtration of to be sped up.

Suitable Island-polymers can be polypropylene, polyethylene, nylon, polyethersulfone, polysulfone, polyvinylidene difluoride, polyester, polyacrylamide, cellulose esters, ABS. In some embodiments the Island polymers are caustic stable to enable the erosion of PLA as the Sea-polymer.

In some embodiments the microparticulate solid may not be thermoplastic microfibers or micro-powders. Non-thermoplastic microparticulate solids may be ceramic, in the form of micro-powders or microfibers. While ceramic materials are not thermoplastic, they are sinterable. In still other embodiments the microparticulate solid may be cellulose microfibers, which are not thermoplastic nor sinterable; however, Van der Waals forces as well as hydrogen bonding between the microfibers are sufficient to render the monoliths formed with cellulose rigid and robust. In still other embodiments the microparticulate solid may be a cross-linked micro-powder or microfiber, (e.g., urethanes or epoxies). In still other embodiments the microparticulate solid may be a carbon micro-powder or microfiber.

Figure 12A:
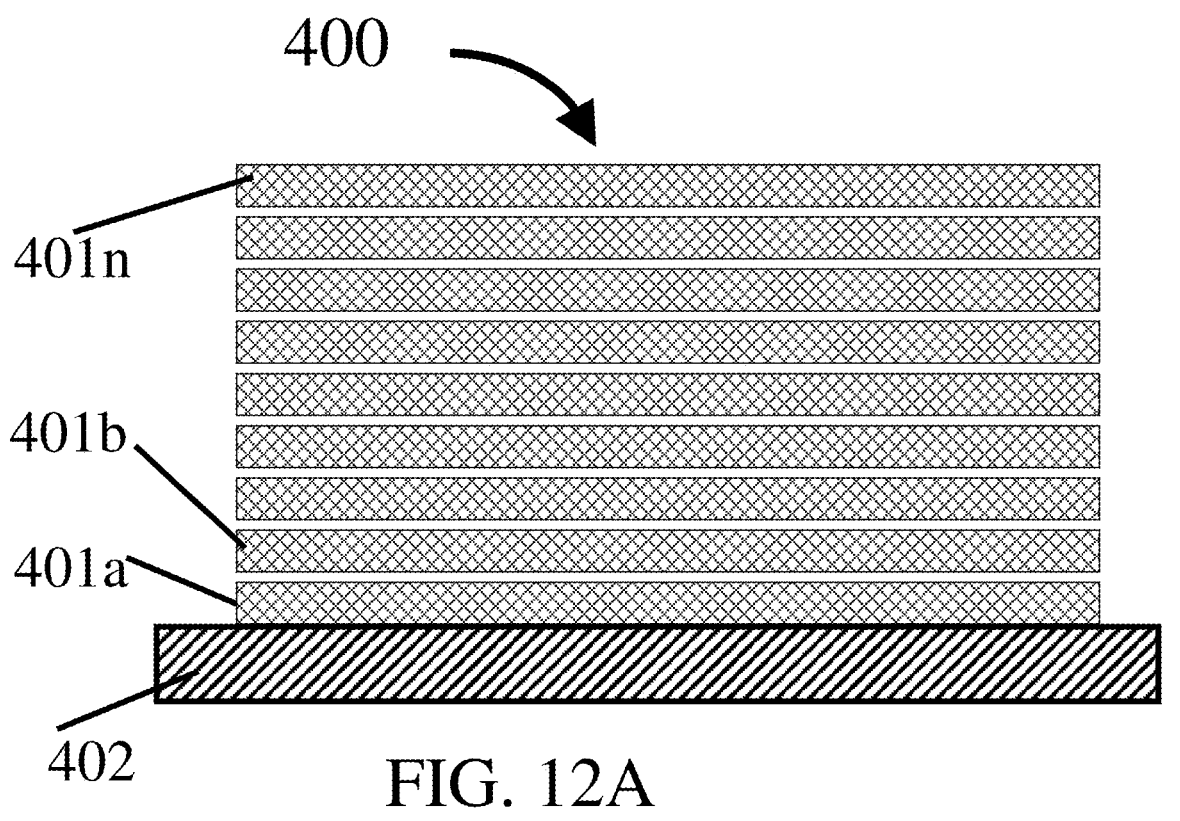
FIGS. 12A-12B are schematic diagrams of monoliths made from nonwoven webs according to embodiments of the invention disclosed herein.
Figure 12B:
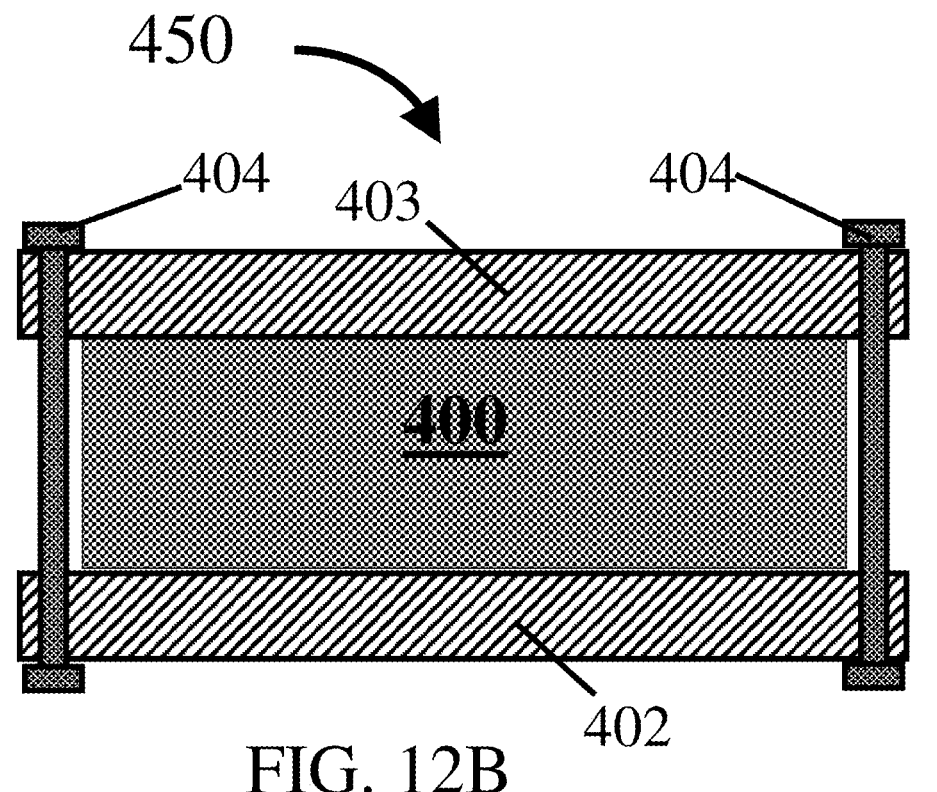
Figures 13A, 13B, 13C, 13D:
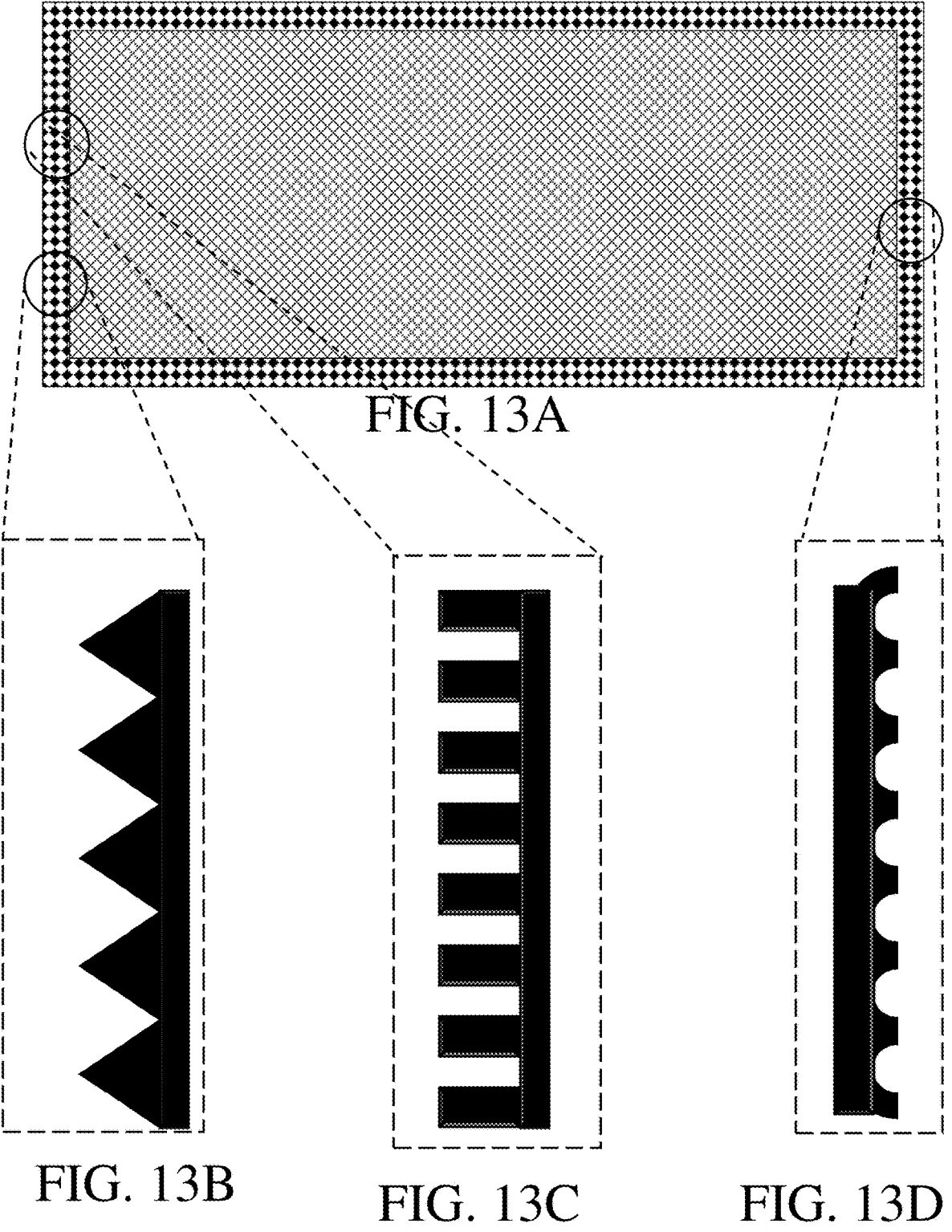
FIGS. 13A-13D are schematic diagrams of various contour patterns used to create a larger bonding area according to embodiments of the invention disclosed herein.

In some embodiments non-woven webs formed with microfibers are layered, compressed to the desired porosity and then sintered to form a monolith. Microfiber-based nonwovens may be fabricated with electrospinning or melt-blowing, two technologies capable of making webs with microfibers of 0.1 to 8 μm. Referring to FIG. 12A, stack 400 is formed by stacking n layers of nonwoven web 401a, 401b, . . . 401n (collectively nonwoven webs 401) on a suitable plate 402. Referring now to FIG. 12B, stack 400 is then compressed with a suitable press to a desired porosity, in this case utilizing plates 402 and 403 bolted together with tie rods 404 to form stack assembly 450. C-clamps or other means of pressing the nonwoven webs that maintains the thickness of compressed stack 400 may also be used. Stack assembly 450 is then sintered at the desired temperature for a given amount of time. After sintering the monolith is removed from stack assembly 450 and further cut to the desired dimensions. Some embodiments include stacked nonwoven webs of polymeric microfibers having an average diameter of about 0.2 μm to about 8 μm.

In other embodiments microporous membranes can be used instead of nonwoven webs. Microporous membranes may be characterized with pores having a diameter of 0.1 to 10 μm. Polymers suitable for making monoliths based on stacking of layers of nonwoven webs or membranes are: nylon; cellulose esters; regenerated cellulose; polypropylene; polyethylene; PVDF; PTFE; polysulfone; polyethersulfone; polyester; polycarbonate; or any other suitable polymer for making nonwoven webs with very fine fibers or microporous membranes.

When integrating layers of membranes, nonwoven webs or monoliths into a device, various treatments may be used to enable the layers to be stacked and the stack of layers reliably potted. Among possible treatments are:

Wetting the stack with water or with other liquids (e.g., glycerol; glycols; alcohols; etc.);

Drying the edge to be potted in a controlled manner such that the rest of the stack remains wet;

Calendaring the edge of each layer prior to stacking;

Treating the edge of each layer with a suitable coating to enable the potting material to penetrate and effectively adhere to the edge;

Bonding a "window frame" to the edge of each layer to provide a more effective structure to pot the stack; and Contouring the edge of each layer to create a larger bonding area when using a potting agent.

Various contour patterns are shown in FIGS. 13A-13D including sawtooth; rectangular indentations; and sinusoidal wave patterns. These contours patterns are, in one embodiment, cut using a laser cutter. Pre-compression of the substrate post stacking or sintering but before potting to reach certain target parameters such as a certain compressive stress may be desirable. The applied compressive stress during assembly may make the potting process more reliable; additionally, it may help with uniformity in fluidic performance and integration into a device. Melting the edges of the substrate, (e.g., using a laser cutter to melt the edges while simultaneously cutting to desired size), makes the device integration process more reliable and decreases the fluid dead volume at the edges of the substrate.

Examples of the structure, manufacture and testing of various embodiments are described below.

Example 1

A rectangular mold having a well 42 mm wide, 95 mm long and 20 mm deep made from aluminum is used to air-lay a fine thermoplastic micro-powder (5 μm nominal powder size) PVDF powder (Kryptonar™ PVDF Powder Coatings-Nile Polymers-Centerville UT). A rectangular #80 mesh screen is placed about three inches from the mold face, affixed to a frame that maintains it in place at the desired height on top of the mold. The frame, screen and mold all have the same inside planar dimensions defined by the size of the well in the mold. A powder reservoir is placed on top of the screen and filled with powder. The screen is vibrated to induce sifting, and the powder allowed to fall into the mold substantially as individual particles or very small clumps no larger than the size of the opening in the screen, until the mold is filled with the air-laid powder and a dry bed of thermoplastic microparticulate solid is formed.

Once the mold is filled it is removed from under the screen, and the surface wiped with a knife edge to level the bed to the top of the mold. A sintering weight with dimensions ½ mm smaller than the mold in both planar dimensions and a mass of 200 grams is placed on top of the powder bed and leveled. Compression of the powder bed occurs when placing the sintering plate on the leveled air-laid bed, in this example 8 mm of compression is affected to obtain a compressed bed thickness of 12 mm. Approximately 18 grams of powder is used to fill the mold. The filled, pressed volume is about 48 cc with a density of 0.38 g/cc, or 21 percent of the density of solid PVDF.

The filled mold with sintering plate is then placed in an air convection oven and sintered for about 80 minutes at 145° C. The mold is then removed from the oven and allowed to cool at room temperature until it is no longer warm.

The sintered monolith is removed from the mold and measured. It has a thickness of 8.75 mm with dimensions of 40 and 90 mm in the XY plane. The density is calculated to be 0.76 g/cc, which translates to a porosity of 62 percent. One skilled in the art understands that the intermediate, manual compression of the unsintered bed is a key variable in controlling the porosity of the sintered monolith, with more pressing producing a denser (less porous) monolith, and less pressing a more porous monolith.

Example 2

The same air laying process as used in example 1 is employed. In this case a Nylon 6/12 powder is used (OR-GASOL 3501EX D NAT 1, Colombes Cedex-France), also nominally 5 μm and a solid density of 1.2 g/cc. The mold and air laying tooling are also the same as in example 1. In this example, the nylon powder has a lower apparent density and only 12 g are used, resulting in a bed density of 0.23 g/cc, or 21.5 percent of the solid density. The filled mold with sintering plate is placed in a typical lab air convection oven and sintered for 80 minutes at 155° C. The mold is then removed from the oven and cooled to room temperature.

The sintered monolith is removed from the mold and measured. It has a thickness of 8.4 mm with planar dimensions of 40 and 90 mm in the XY plane. The density is calculated to be 0.42 g/cc giving it a porosity of 61 percent.

Example 3

The sintered monoliths of examples 1 and 2 were evaluated for total internal surface area as measured by Brunauer-Emmett-Teller surface area analysis (BET). The monolith of example 1 was found to have a specific surface area (as measured/evaluated by BET) of 0.5 $m^2$/cc and that of example 2 a specific surface area of 0.6 $m^2$/cc (see ASTM D3663-20: "Standard Test Method for Surface Area of Catalysts and Catalyst Carriers").

Example 4

The sintered monolith of examples 1 were evaluated for Integrity/Asymmetry on an AKTA® Prime chromatography system (Cytiva Life Sciences). The monolith it the appropriate fluid delivery system was found to have an Asymmetry in the 1.0-2.0 range, indicating and integral device.

Example 5

The sintered monoliths of examples 1 and 2 were evaluated for Pore size using bubble point (ASTM F316) and capillary flow testing per ASTM D6767. For both materials the results of ASTM F316 indicated a maximum pore size as determined by bubble point in the 5-6 μm range. For the capillary flow test the minimum pore was found to be 1-2 microns and the average in the 2-3-micron range. In both cases a Pore correction factor ("K") of 0.75. A factor of 1.0 is used for perfectly circular pores. See FIG. 6 for further details.

Example 6

Figure 4:
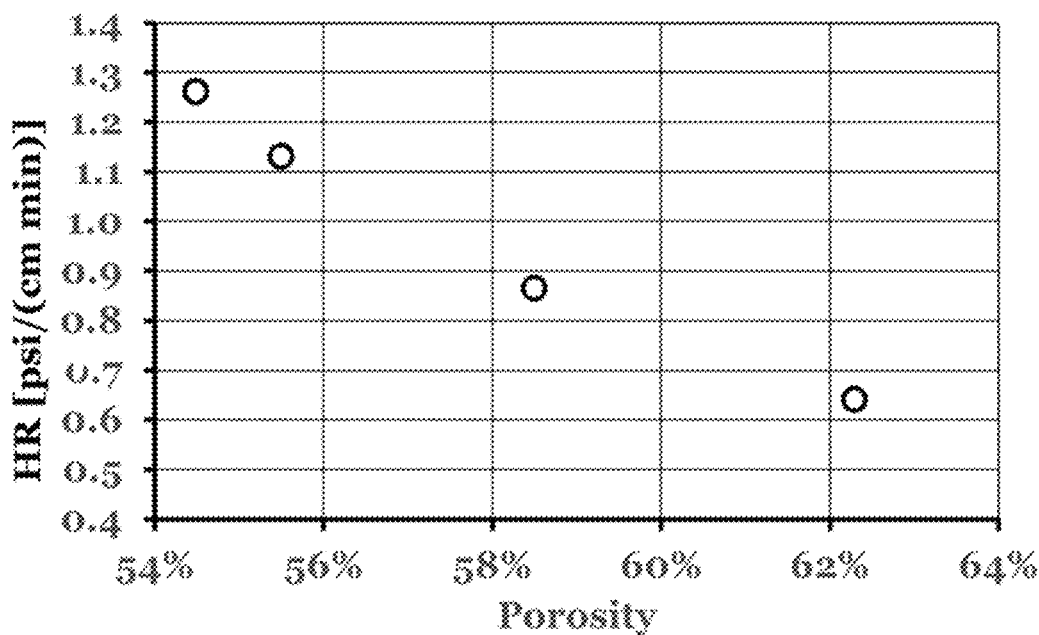
FIG. 4 is a graph of hydraulic resistance for a sintered PVDF Monolith 7.5 mm thick according to one embodiment of the invention disclosed herein.

The sintered monoliths of examples 1 were evaluated for hydraulic resistance. The amount of pressure required for water flows through the sintered monolith was measured for materials with porosities ranging from 54 percent to 64 percent as shown in FIG. 4. The pressure is divided by the flow and multiplied by the incident area to calculated the hydraulics resistance (psi/(cm*min)).

Media used in a chromatographic bed should induce a very uniform fluid velocity through the media bed. Uniformity enables similar residence time on a cross section of the bed. In conventional beds packed with beads, this is not so much a property of the media itself but of the packing of the media into a bed. However, in the case of a polymeric monoliths the uniformity of the structure, particularly in the x/y-plane perpendicular to the flow direction (the z direction), is very important. Unlike a column, a monolith is not "packed," and the uniformity is not insured by proper packing but by the polymeric monoliths itself.

Example 7

3.75 g of Acrylic nanofibrillated microfibers (EFT Fibers; Item #A-010-4; 3.0 denier; Degree of Fibrillation, CSF**10±5 mL; 25 w/w percent solids; 4 mm precursor fiber length; 0.5 μm average fiber diameter) are wet laid into a circular bed of approximately 46 mm diameter and 10 mm thick. The bed is pressed in a mold 46 mm in diameter to a thickness of 7.5 mm and held in this state of compression while being heat treated in a convection over at a temperature of 130 degrees C. for two hours.

The compacted and sintered bed is allowed to cool to room temperature, removed from the mold and measured. The finished monolith is found to have a diameter of 41.2 cm, a thickness of 6.85 mm leading to a density of 0.411 g/cc and a porosity of 65 percent. The monolith could readily be cut to the desired dimensions without losing its integrity; however, it is noted the fibers could be readily delaminated from the monolithic structure if the surfaces are rubbed hard enough.

One skilled in the art will understand that blends or combinations/mixtures of powders and fibers can also be wet or dried laid, compressed and sintered to produce thermoplastic monolithic microporous substrates. In these embodiments, the total solid volume of the structure includes of 0 to approximately 100 percent either fiber or powder. In some embodiments blends of micro-powders and microfibers may be used, hereinafter referred to as a "mixture." Monoliths may be made with mixtures using either a dry-laying or a wet-laying process.

Some materials may not sinter well but stick together sufficiently to enable the monolith to have structural integrity, (e.g., cellulose). Additionally, it may be practical to make a monolith of something that will not sinter or stick together, (e.g., carbon fiber), but can be bonded together with another material after compressing it into a bed and then coating the internal surfaces of the compressed bed with some sort of bonding agent, (e.g., an epoxy). The terms "pore size" and "pore diameter," as well as "fiber size" and "fiber diameter" are used interchangeably, unless describing a distribution of sizes.

Isochronous Distribution in Circular Adsorptive Devices

The concept of the isochronous planar distributor can be applied to other adsorptive bed structures common in chromatography beyond the rectangular cassette discussed earlier. One such common structure are the radial flow devices, as for example, Sartobind® capsules (Sartorius Inc. Göttingen, Germany) and BIA CIM® capsules (BIA Separations, Ajdovščina, Slovenia), where the adsorptive bed is an annular cylinder and the flow is radial from the outside of the cylindrical annulus to the inside, in these two examples. Another such common bed structure is that used with conventional chromatography columns, for example Opus® Columns (Repligen Inc., Watertown, Massachusetts), wherein the adsorptive bed is a cylinder and the flow is axial.

Figure 14A:
FIG. 14A is a schematic diagram of an isometric view of a radial flow adsorptive bed according to embodiments of the invention disclosed herein.
Figure 14A:
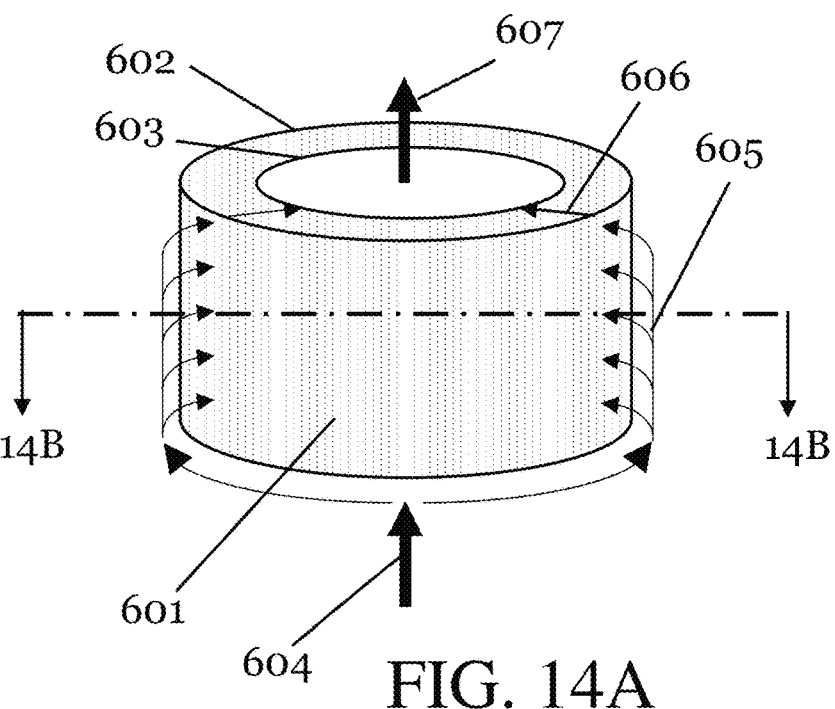

Referring to FIG. 14A, radial flow bed 600 includes adsorptive media 601 in the form of an annular cylinder, having an outer diameter (OD) 602 and an inner diameter (ID) 603. Feed stream 604 (indicated by arrows) gets distributed through a radial distributor (not shown) to the OD of adsorptive media 601, where planar distributor on OD 602 (not shown) further distributes the flow creating flow streamlines 605 (indicated by arrows) that are then directed radially from the OD to the ID of adsorptive media 601, as represented by arrows 606. Flow through adsorptive media 601 is then collected by planar distributor on ID 603 (not shown) to generate eluent stream 607 (indicated by arrows).

Figure 14B:
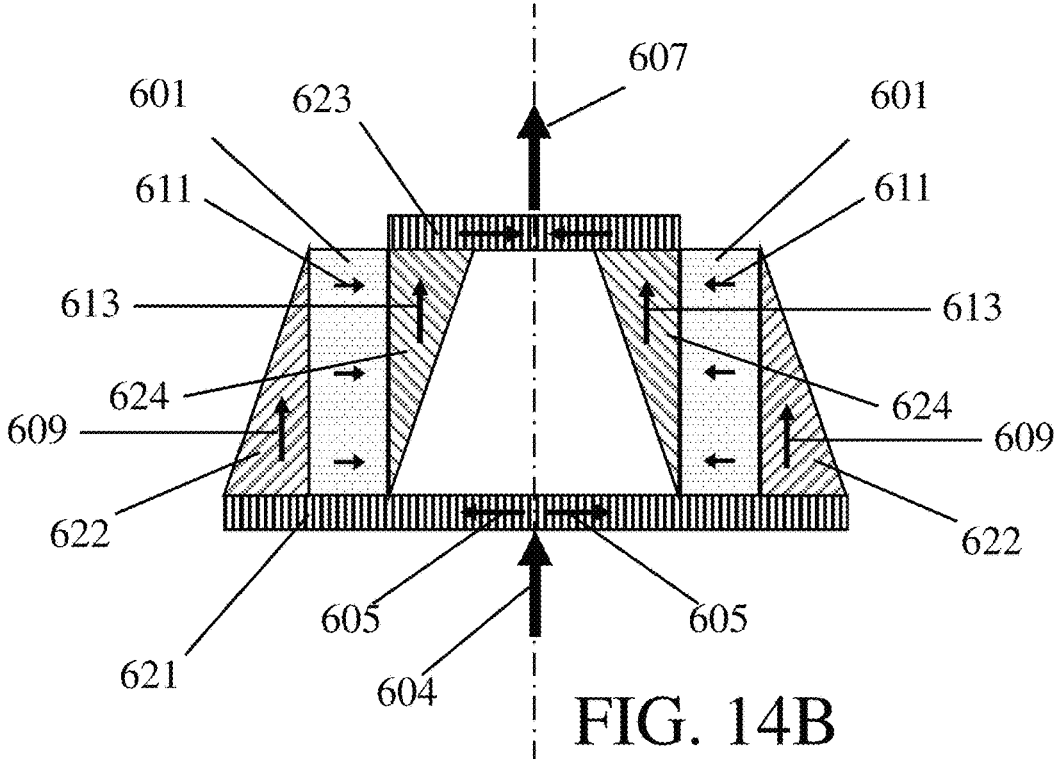
FIG. 14B is a schematic diagram of a cross-sectional view of the radial flow adsorptive bed of FIG. 14A illustrating details of axial isochronous distributors.

FIG. 14B is a cross-sectional cut 14B-14B of radial flow bed 600 illustrating in detail the network of isochronous distributors. Feed stream 604 is distributed to OD 602 of adsorptive media 601 through intermediate distributor 621 as represented by flow arrows 605, in this case a radial distributor, delivering feed stream 604 to planar distributor 622 on OD 602 of adsorptive media 601. Planar distributor 622 has an annular shape further redirecting feed flow axially as represented by arrows 609. The cross-sectional flow area of planar distributor 622 converges along the axial dimension to maintain an approximately constant velocity 609 along the length of planar distributor 622, enabling it to be an isochronous distributor. Flow through adsorptive media 601, represented by flow arrows 611, is further collected by planar distributor 624 at ID 603 of adsorptive media 601. The cross-sectional flow area of planar distributor 624 diverges along the axial dimension to maintain an approximately constant velocity 613 along the length of planar distributor 624, enabling it to be an isochronous distributor. Finally, eluent collected in planar distributor 624 is then collected as a single eluent stream 607 through intermediate distributor 623. Planar distributors 622 and 624 are isochronous distributors by virtue of having the same direction of flow (iso-direction) and an approximately constant velocity induced by the converging/diverging cross-sectional area. Isochronous distributors achieve a narrow residence time distribution.

It should be understood that the flow direction of radial flow bed 600 of FIGS. 14A and 14B could be reversed, such that feed stream 604 is fed at the ID 603 and eluent stream 607 collected at the OD 602. The direction of the flow arrows would also be reversed, but the distribution network would function in the same manner as illustrated in FIGS. 14A and 14B.

Figure 15A:
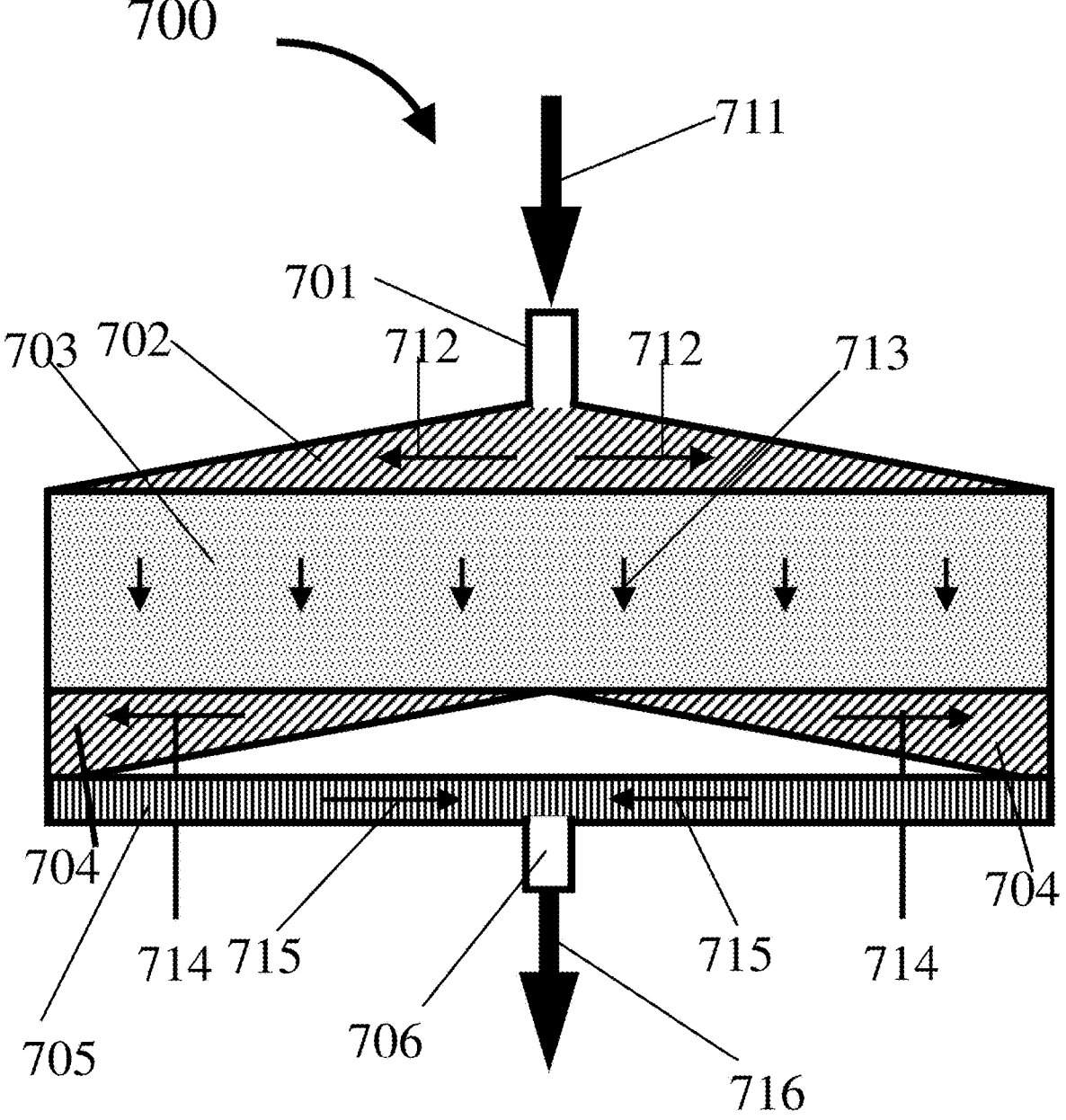
FIG. 15A is a schematic diagram of a cross-sectional view of a cylindrical chromatography column according to embodiments of the invention disclosed herein.

Referring to FIG. 15A, a cross-sectional view, cylindrical chromatography column 700 includes feed port 701, feed planar distributor 702, adsorptive bed 703, eluent planar distributor (collector) 704, intermediate (eluent) distributor 705 and eluent port 706. It should be understood that all these elements have a circular geometry not apparent because this is a cross-sectional view. Feed stream 711 is fed to the center of (radial) planar distributor 702 redirecting the flow radially as represented by arrows 712. Planar distributor 702 redirects the flow into adsorptive bed 703, as represented by axial arrows 713. The cross-sectional flow area of planar distributor 702 decreases along the radial dimension in a manner that maintains feed stream velocity 712 within planar distributor 702 approximately constant. The liquid issuing from adsorptive bed 703 is then collected at (radial) planar distributor 704, whose cross-sectional area for flow increases along the radial dimension in a manner that maintains eluent stream velocity 714 within planar distributor 702 approximately constant. The eluent stream collected by planar distributor 704 at the perimeter of cylindrical chromatography column 700 is then redirected to intermediate distributor 705, a radial flow distributor, that collects the eluent from the perimeter of cylindrical chromatography column 700 and directs it to eluent port 706 at the center of center of intermediate distributor 705 to generate eluent stream 716. Planar distributors 702 and 704 are isochronous distributors by virtue of having the same direction of flow (iso-direction) and an approximately constant velocity induced by the converging/diverging cross-sectional area. Isochronous distributors achieve a narrow residence time distribution.

Figure 15B:
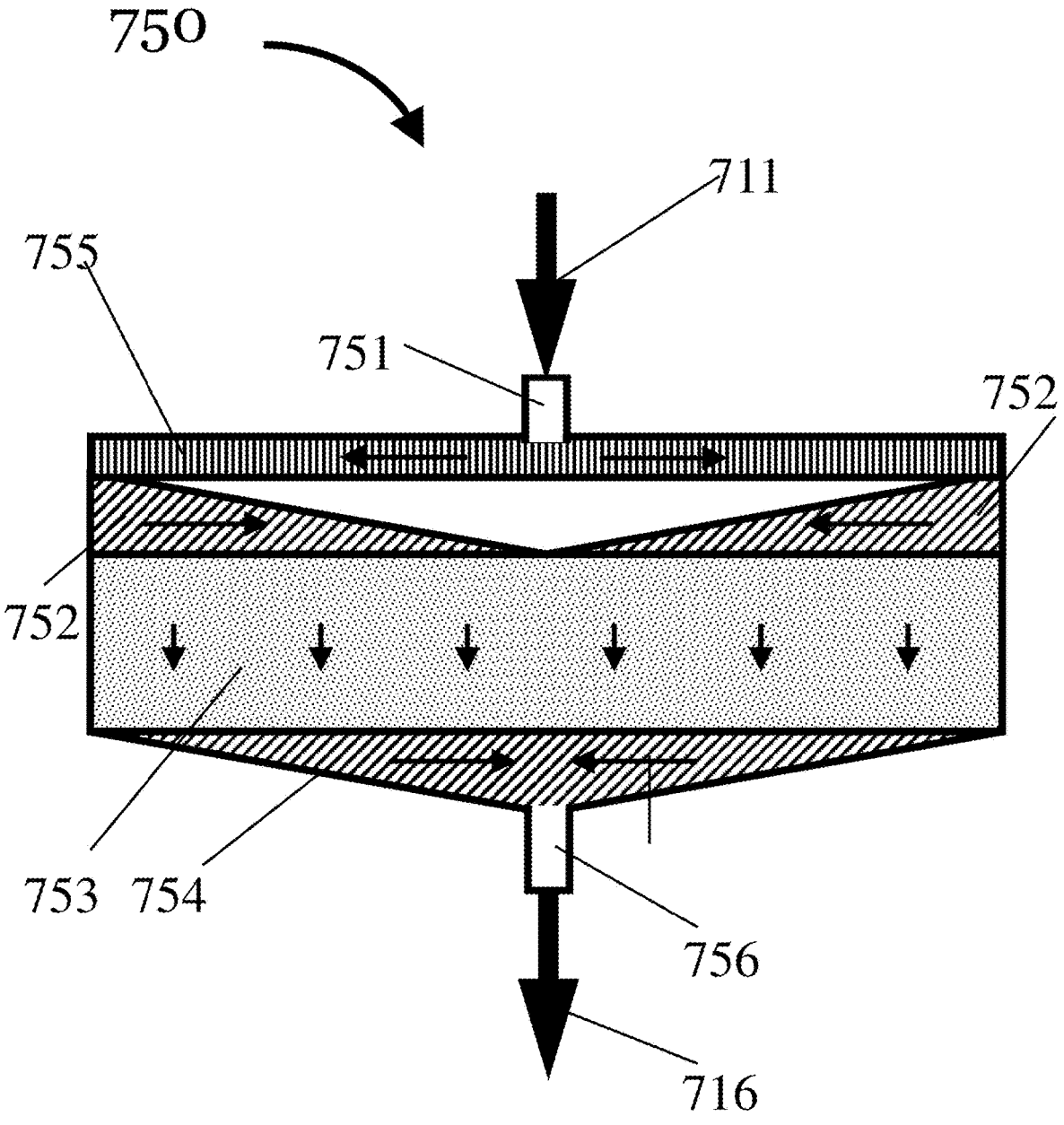
FIG. 15B is a schematic diagram of a cross-sectional view of the cylindrical chromatography column of FIG. 15A with the flow reversed from that of FIG. 15A.

Cylindrical chromatography column 700 can be run in reverse (i.e., the feed stream 711 and eluent stream 716 are inverted). Referring to FIG. 15B, cylindrical chromatography column 750 includes feed port 751, connected to intermediate distributor 755 to redirect the feed stream to the perimeter of cylindrical chromatography column 750, which is further redirected and distributed by planar distributor 752 to adsorptive bed 753, and finally collected in planar distributor 754, which directs the eluent-to-eluent port 756. Planar distributors 752 and 754 are isochronous distributors by virtue of having the same direction of flow (iso-direction) and an approximately constant velocity induced by the converging/diverging cross-sectional area. Isochronous distributors achieve a narrow residence time distribution.

It should be noted that the thicknesses of all the distributors shown in FIGS. 14A, 14B, 15A and 15B are greatly exaggerated for illustration purposes. To obtain high resolution in adsorptive chromatographic device it is important that the volume of the distributors be maintained as small as possible to reduce the chromatographic dispersion induced by the distributors. The extra-bed volume is defined in equation (7) as the fractional volume of the device that is outside the adsorptive media:

$$\text{Extra-Bed Volume} = [\text{Total Device Volume}] \div [\text{Media Volume}] - 1; \quad (7)$$

and it is represented as a fraction or a percentage. In some embodiments the extra-bed volume is less than 50 percent; in still other embodiments it is less than 30 percent; in still other embodiments it is less than 15 percent; in still other embodiments it is less than 10 percent; in still other embodiments it is less than 5.0 percent.

The planar distributors of planar rectangular media and planar radial-flow media such as media 600 of FIG. 14A converge and diverge approximately linearly. In contrast planar distributors 702 and 704 of FIG. 15A and distributors and 754 of FIG. 15B do not converge linearly, although even they might appear to being linearly convergent. These distributors converge nonlinearly based on the criteria that the convergence is designed to maintain the velocity approximately constant; the nonlinear shape of the distributor can be easily obtained by anyone skilled in the art. Stackable, Planar, Cylindrical Adsorptive Devices with Isochronous Distributors A key inventive element of these devices is that they have planar exterior geometry enabling stackability and linear scalability. As described herein, isochronous distributors are useful in conventional chromatography columns. A new stackable, planar, circular chromatography column having planar isochrous distributors is described below.

Figures 16A, 16B:
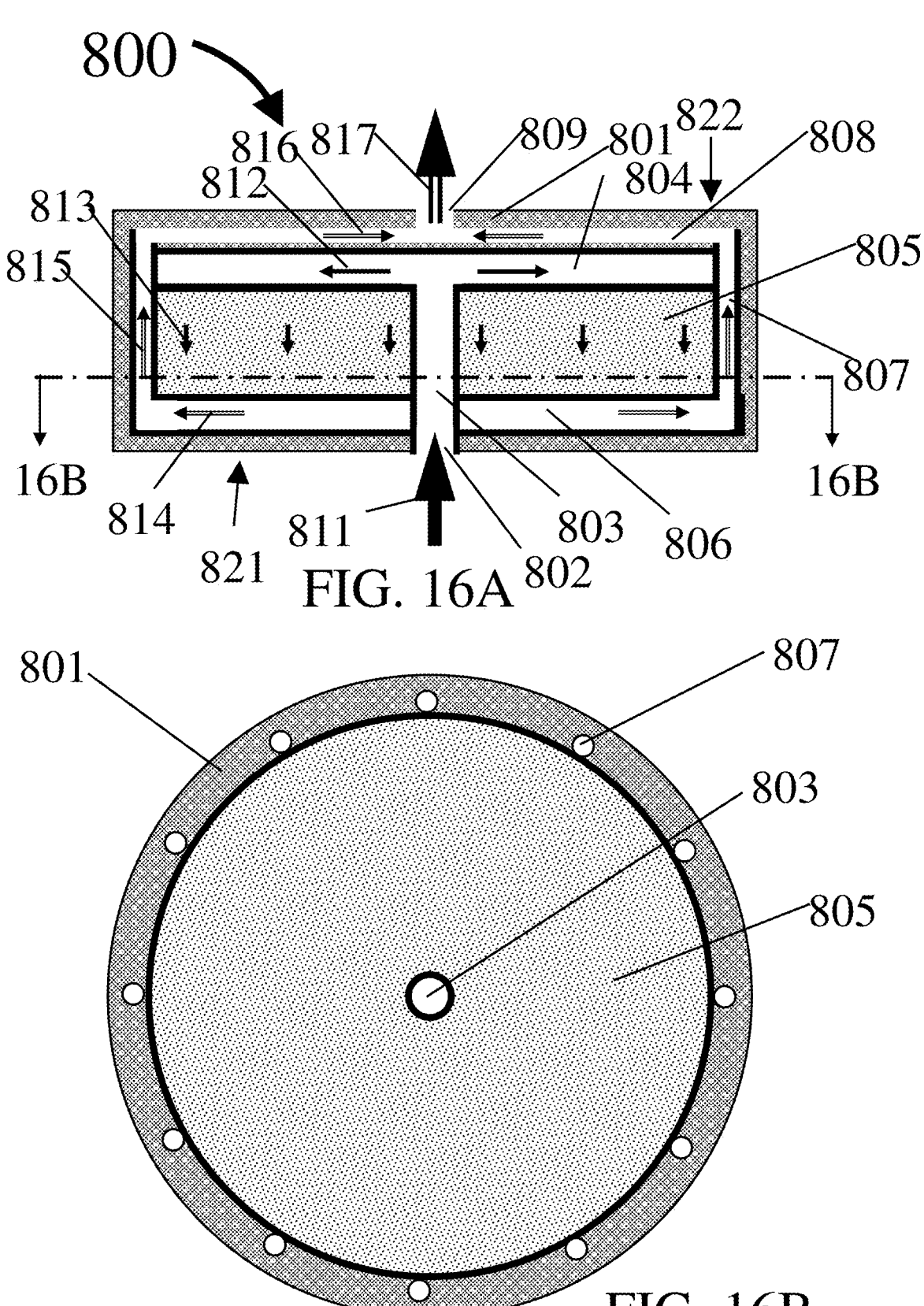
FIG. 16A is a schematic diagram of a cross-sectional sideview of a modular chromatography column according to embodiments of the invention disclosed herein.
FIG. 16B is a schematic diagram of a cross-sectional top view of the modular chromatography column of FIG. 16A along plane 16B.

FIG. 16A is a cross-sectional sideview of modular chromatography column 800 comprising housing 801, feed port 802, center distributor 803, planar distributor assembly 804, adsorptive bed 805, planar distributor assembly 806, peripheral distributor 807, radial distributor 808 and eluent port 809. With the arrows representing the liquid flow direction, the flow configuration is as follows: feed stream 811 enters feed port 802 which is connected to (feed) center distributor 803, directing feed stream 811 to (feed) planar distributor assembly 804, which redirects flow 812 and distributes it radially outward to feed adsorptive bed 805, generating bed flow 813. The eluent from the adsorptive bed 805 is collected in planar distributor assembly 806, directing the eluent 814 radially outward to peripheral distributor 807, redirecting eluent flow 815 through radial distributor 808, which redirects eluent flow 816 radially inward towards eluent port 809, finally generating eluent stream 817. FIG. 16B is a cross-sectional view of modular chromatography column 800 along plane 16B, illustrating more clearly the circular geometry and radial symmetry: housing 801, center distributor 803; peripheral distributor 807; and adsorptive bed 805.

In the embodiment shown in FIGS. 16A and 16B the feed stream 811 is fed to the center distributor 803 and eluent is collected through peripheral distributor 807; in other embodiments the flow direction may be reversed. It should be noted that the thickness of the conduits and distributors has been exaggerated to illustrate the inventive concepts; in actual devices the diameter of the center distributor 803 and peripheral distributor 807, and the thickness of planar distributor assemblies 804 and 806 are as small as possible to reduce chromatographic dispersion induced by the extra-bed volume. Furthermore, note that modular chromatography column 800 has top and bottom planar surfaces 821 and 822, respectively, enabling it to be stacked with other identical modular chromatography columns as will be discussed shortly.

Figure 17A:
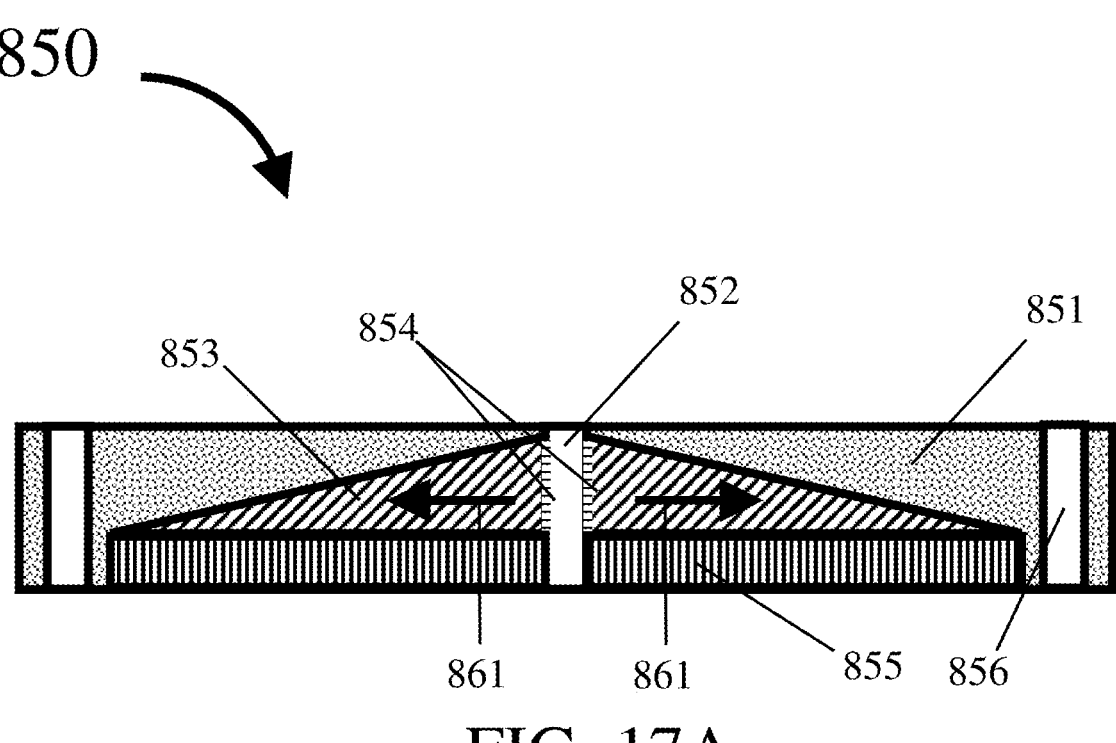
FIG. 17A is a schematic diagram of a cross-sectional sideview of a radial planar distributor assembly used to distribute a feed stream according to embodiments of the invention disclosed herein.

Referring now to FIG. 17A, planar distributor assembly 850, in this embodiment used to distribute the feed stream, includes housing 851, center distributor 852, planar distributor 853, feed packing retainer 855 (also referred to as frit) and peripheral distributor 856. Center distributor 852 includes passageways 854 to enable the feed stream to flow from center distributor 852 to planar distributor 853. Planar distributor 853 is radially symmetric with the cross-sectional area for flow decreasing along the radius (i.e., a converging channel) in a configuration that maintains the velocity of the fluid 861 approximately constant. Distributor 853 converges non-linearly to maintain the velocity 861 approximately constant.

Figure 17B:
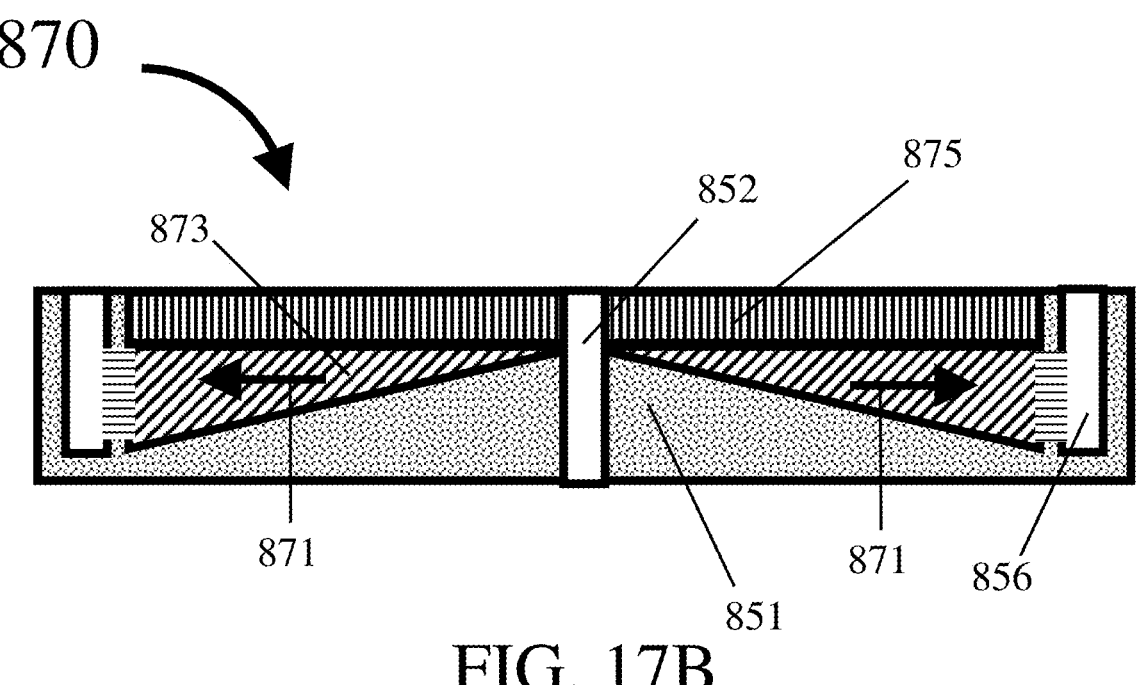
FIG. 17B is a schematic diagram of a cross-sectional sideview of a radial planar distributor assembly used to collect an eluent stream according to embodiments of the invention disclosed herein.

Referring now to FIG. 17B, planar distributor assembly 870, in this embodiment used to collect the eluent stream, includes housing 851, center distributor 852, planar distributor 873, eluent packing retainer 875 (also referred to as frit) and peripheral distributor 856. Peripheral distributor 856 includes passageways (not shown) to enable the feed stream to flow from center planar distributor 873 to Peripheral distributor 856. Planar distributor 873 is radially symmetric with the cross-sectional area for flow increasing along the radius, a diverging channel, in a manner that maintains the velocity of the fluid 871 approximately constant.

The unidirectional flow on both planar distributors in combination with the velocities within each planar distributor being approximately constant is generally required to render planar distributors 853 and 873 to be an isochronous distributor pair.

Figure 18:
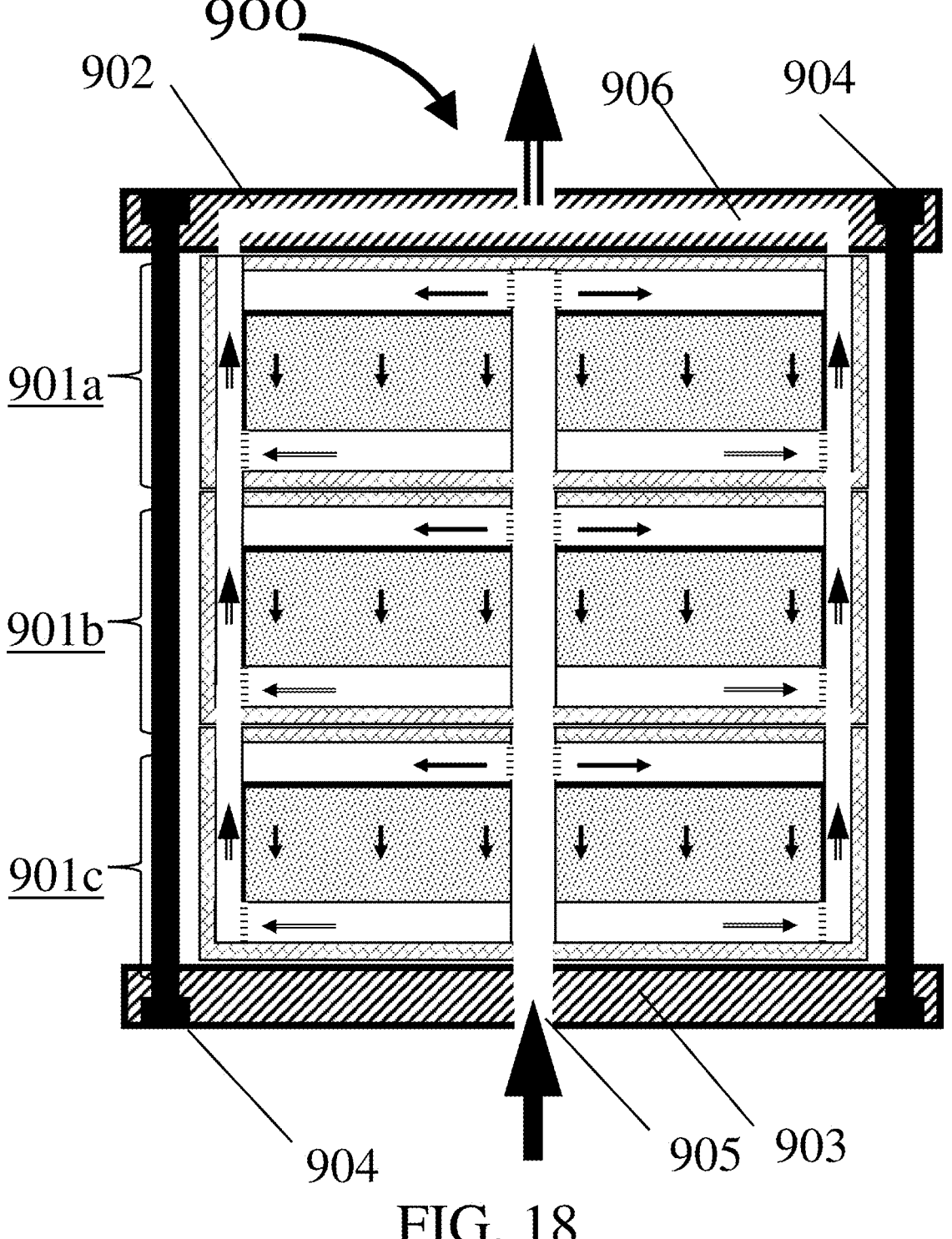
FIG. 18 is a schematic diagram of a cross-sectional sideview of a modular chromatography stack according to embodiments of the invention disclosed herein.

Referring now to FIG. 18, modular chromatography stack 900 includes identical chromatography columns 901a, 901b, 901c (collectively, columns 901), bottom end plate 903 having inter-column feed stream distributor 905, top end plate 902 having eluent stream distributor 906, and tie rods 904. The arrows represent the flow direction of the fluid within each chromatography column, the eluent streams being represented by arrows having a double line. Although modular chromatography stack 900 is shown as having only three columns 901, it is noted that any number of columns can be stacked.

It is understood that although the embodiments described herein relate specifically to separations of interest in biomolecular applications, the principles, practice and designs described herein are also useful in other applications, including but not limited to the manufacture of vaccines and other macromolecules not necessarily of a biological nature. All literature and similar material cited in this application, including, patents, patent applications, articles, books, treatises, dissertations and web pages, regardless of the format of such literature and similar materials, are expressly incorporated by reference in their entirety. In the event that one or more of the incorporated literature and similar materials differs from or contradicts this application, including defined terms, term usage, described techniques, or the like, this application controls.

The section headings used herein are for organizational purposes only and are not to be construed as limiting the subject matter described in any way. The descriptions and diagrams of the methods described herein can be performed in any suitable order unless otherwise indicated herein or otherwise clearly contradicted by context.

The claims should not be read as limited to the described order or elements unless stated to that effect. It should be understood, that various changes in form and detail may be made without departing from the scope of the appended claims. Therefore, all embodiments that come within the scope and spirit of the following claims and equivalents thereto are claimed. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. Embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A monolithic chromatographic microporous substrate comprising a sintered microparticulate solid forming the monolithic chromatographic substrate having an average pore diameter from about 0.5 µm to about 10 µm, a porosity of about 50 percent to about 80 percent and a thickness greater than 1.0 mm; and wherein the microporous substrate has a compressive modulus greater than about 50 psi (0.345 MPa).

2. The monolithic chromatographic microporous substrate of claim 1, wherein the sintered microparticulate solid is a microparticulate powder having an average particle diameter range of about 1.0 µm to about 50 µm.

3. The monolithic chromatographic microporous substrate of claim 2, wherein the microparticulate powder the average particle diameter range is about 5.0 µm to about 10 µm.

4. The monolithic chromatographic microporous substrate of claim 1, wherein the sintered microparticulate solid comprises polymeric microfibers having an average diameter of about 0.2 µm to about 8 µm; and wherein the monolithic microporous substrate compressive modulus is greater than about 500 psi (3.45 MPa).

5. The monolithic chromatographic microporous substrate of claim 4, wherein the polymeric microfibers have an average diameter of about 0.5 µm to about 4 µm; and wherein the monolithic microporous substrate compressive modulus is greater than about 1000 psi (6.90 MPa).

6. The monolithic chromatographic microporous substrate of claim 1, wherein the sintered microparticulate solid is a mixture of a microparticulate powder having an average particle diameter of about 1.0 µm to 50 µm and a polymeric microfiber having an average diameter of about 0.2 µm to about 8 µm and an average aspect ratio of about 10 to about 1000; and wherein the microparticulate powder comprises up to about 50 percent of a total solid volume of the monolithic microporous substrate.

7. The monolithic chromatographic microporous substrate of claim 1, wherein an average pore size is about 0.5 µm to about 3 µm and a porosity of about 55 percent to about 70 percent;

wherein the sintered microparticulate solid comprises stacked nonwoven webs of polymeric microfibers wherein the stacked nonwoven webs of polymeric microfibers have an average diameter of about 0.2 µm to about 8 µm; and wherein the stacked nonwoven webs of polymeric microfibers are convectively sintered.

8. The monolithic chromatographic microporous substrate of claim 1, further comprising:

a housing wherein said monolithic microporous substrate is bonded to the housing to form a chromatographic cassette.

9. The monolithic chromatographic microporous substrate of claim 8, wherein the chromatographic cassette has a height equivalent of a theoretical plate (HETP) lower than about 400 µm and an asymmetry of about 0.9 to about 2 at a bed superficial velocity of about 1.0 cm/min.

10. The monolithic chromatographic microporous substrate of claim 1, wherein the average pore diameter is about 5 µm to about 10 µm, and the thickness is greater than 2.0 mm.

11. The monolithic chromatographic microporous substrate of claim 1, wherein the monolithic microporous substrate compressive modulus is greater than about 500 psi (3.45 MPa).

12. The monolithic chromatographic microporous substrate of claim 4 wherein the sintered microparticulate solid comprises polymeric microfibers having an average diameter of about 0.8 µm to about 8 µm.

13. The monolithic chromatographic microporous substrate of claim 5, wherein the polymeric microfibers have an average diameter of about 1 µm to about 4 µm.

14. The monolithic chromatographic microporous substrate of claim 7, wherein the polymeric microfibers have an average diameter of about 0.8 µm to about 3 µm.

* * * * *